US009137220B2

(12) United States Patent　　　　　　　　　(10) Patent No.: US 9,137,220 B2
Crosbie et al.　　　　　　　　　　　　　　　　(45) Date of Patent: Sep. 15, 2015

(54) SECURE SHARING AND COLLABORATIVE EDITING OF DOCUMENTS IN CLOUD BASED APPLICATIONS

(71) Applicant: International Business Machines Corporation, Armonk, NY (US)

(72) Inventors: Mark Crosbie, Malahide (IE); Jason Flood, Mulhuddart (IE); Juan Galiana Lara, Mulhuddart (IE); Javier Marcos de Prado, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 143 days.

(21) Appl. No.: 14/055,276

(22) Filed: Oct. 16, 2013

(65) Prior Publication Data

US 2014/0115332 A1　　Apr. 24, 2014

(30) Foreign Application Priority Data

Oct. 19, 2012　　(GB) .................................. 1218810.8

(51) Int. Cl.
| | |
|---|---|
| *H04L 29/06* | (2006.01) |
| *G06F 17/24* | (2006.01) |
| *G06F 17/22* | (2006.01) |
| *G06F 21/62* | (2013.01) |

(52) U.S. Cl.
CPC ........ *H04L 63/0442* (2013.01); *G06F 17/2288* (2013.01); *G06F 17/24* (2013.01); *G06F 21/6218* (2013.01)

(58) Field of Classification Search
CPC ............ H04L 63/0044; G06F 21/6218; G06F 17/2288; G06F 17/24
See application file for complete search history.

(56) References Cited

U.S. PATENT DOCUMENTS

| | | | |
|---|---|---|---|
| 5,787,175 A | | 7/1998 | Carter |
| 6,314,425 B1* | | 11/2001 | Serbinis et al. ........................ 1/1 |
| 6,449,718 B1* | | 9/2002 | Rucklidge et al. ............. 713/168 |
| 6,515,988 B1* | | 2/2003 | Eldridge et al. ............... 370/389 |
| 7,290,285 B2* | | 10/2007 | McCurdy et al. ................ 726/27 |
| 2001/0018739 A1* | | 8/2001 | Anderson et al. ............. 713/176 |
| 2011/0145593 A1* | | 6/2011 | Auradkar et al. ............. 713/189 |
| 2012/0030187 A1* | | 2/2012 | Marano et al. ................ 707/709 |

(Continued)

FOREIGN PATENT DOCUMENTS

EP　　1586976 A2　　10/2005

OTHER PUBLICATIONS

GB Appln. No. GB1218810.8, Search Report, Mar. 18, 2013, 3 pg.

*Primary Examiner* — Techane Gergiso
(74) *Attorney, Agent, or Firm* — Cuenot, Forsythe & Kim, LLC

(57) ABSTRACT

Collaboratively editing a document in a system of sharee clients includes creating a document change, generating a document token for encrypting the document change, encrypting the document change with the document token, making the encrypted document change available to the other sharee clients, and generating a plurality of copies of the sharee document token. Each sharee document token is encrypted with a respective sharee's public key. Each encrypted sharee document token is distributed to respective sharee clients. Each sharee client is configured to: decrypt a sharee document token using a respective private key, decrypt the encrypted document change using the share document token, and consolidate the document change into a document.

12 Claims, 23 Drawing Sheets

(56) References Cited

U.S. PATENT DOCUMENTS

| | | | |
|---|---|---|---|
| 2012/0179909 A1* | 7/2012 | Sagi et al. | 713/167 |
| 2012/0233535 A1* | 9/2012 | Piersol | 715/234 |
| 2014/0032900 A1* | 1/2014 | Donahue | 713/165 |
| 2014/0082095 A1* | 3/2014 | Balinsky et al. | 709/206 |

* cited by examiner

SECURE SHARING AND COLLABORATIVE EDITING OF DOCUMENTS IN CLOUD BASED APPLICATIONS

CROSS-REFERENCE TO RELATED APPLICATIONS

This application claims the benefit of United Kingdom Application Number 1218810.8 filed on Oct. 19, 2012, which is fully incorporated herein by reference.

BACKGROUND

A Cloud-based software service is a software service where it is not important to understand who or where the host of the service is. Cloud-based solutions offer a value proposition to companies who wish to enable a mobile workforce so it is tempting to use them for as much as possible and even access to critical company information. Cloud-based solutions are challenging the traditional boundary between "inside" and "outside" the network. Cloud-based solutions for team collaboration, team file sharing, and group email systems are key offerings in the software as a service (SaaS) marketplace.

A security challenge exists when business critical information is entrusted to an external service provider in the Cloud because that external service provider is unknown. The main concern is around confidentiality of the information; if business critical information is stored with an unknown external service provider, how can a business be sure that it is not inadvertently revealed to the unauthorized party? A standard approach to solving this problem is through the use of cryptography. It is well understood how to use a combination of symmetric algorithms (for example, data encryption standard (DES), international data encryption algorithm (IDEA) and advanced encryption standard (AES)) to encrypt large volumes of data, while using public-private key algorithms to perform key-exchange and non-repudiation of endpoint identity.

While cryptography solves the issue of confidentiality in the Cloud for file storage, it comes with certain limitations. A file can be encrypted at one of two points; by a user on their client system prior to sending to the Cloud, or in the Cloud server itself. If a user encrypts a file at their desktop then there is an issue of key management for a large number of end-user points, potentially numbered in the thousands for enterprise users. Additionally users can forget to encrypt files before sending them into the Cloud. If the files are encrypted on the server then the decision making process can be simplified for the user; all files are encrypted by default. But then the server must manage the encryption keys, and becomes a primary target for attackers. If the server encryption key store is compromised then all file contents are revealed, with disastrous consequences.

Known file servers can encrypt files stored on the file server but if an attacker breaks into the file server then security is compromised because files and keys are stored together.

BRIEF SUMMARY

A method for collaboratively editing a document in a system of sharee clients includes creating a document change, generating a document token for encrypting the document change, encrypting the document change with the document token, making the encrypted document change available to the other sharee clients, and generating a plurality of copies of the sharee document token. Each sharee document token is encrypted with a respective sharee's public key. Each encrypted share document token is distributed to respective sharee clients. Each sharee client is configured to: decrypt a sharee document token using a respective private key, decrypt the encrypted document change using the share document token, and consolidate the document change into a document.

A system for collaboratively editing a document between a plurality of sharee clients includes a processor programmed to initiate executable operations. The executable operations include creating a document change, generating a document token for encrypting the document change, encrypting the document change with the document token, making the encrypted document change available to the other sharee clients, and generating a plurality of copies of the sharee document token. Each sharee document token is encrypted with a respective sharee's public key. Each encrypted share document token is distributed to respective sharee clients. Each sharee client is configured to: decrypt a sharee document token using a respective private key, decrypt the encrypted document change using the share document token, and consolidate the document change into a document.

A computer program product for collaboratively editing a document in a system of sharee clients includes a computer readable storage medium having program code stored thereon. The program code is executable by a processor to perform a method. The method includes creating a document change using the processor, generating a document token for encrypting the document change using the processor, encrypting the document change with the document token using the processor, making the encrypted document change available to the other sharee clients using the processor, and generating a plurality of copies of the sharee document token using the processor. Each sharee document token is encrypted with a respective sharee's public key using the processor. Each encrypted share document token is distributed to respective sharee clients using the processor. Each sharee client is configured to: decrypt a sharee document token using a respective private key, decrypt the encrypted document change using the share document token, and consolidate the document change into a document.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Figure 1:
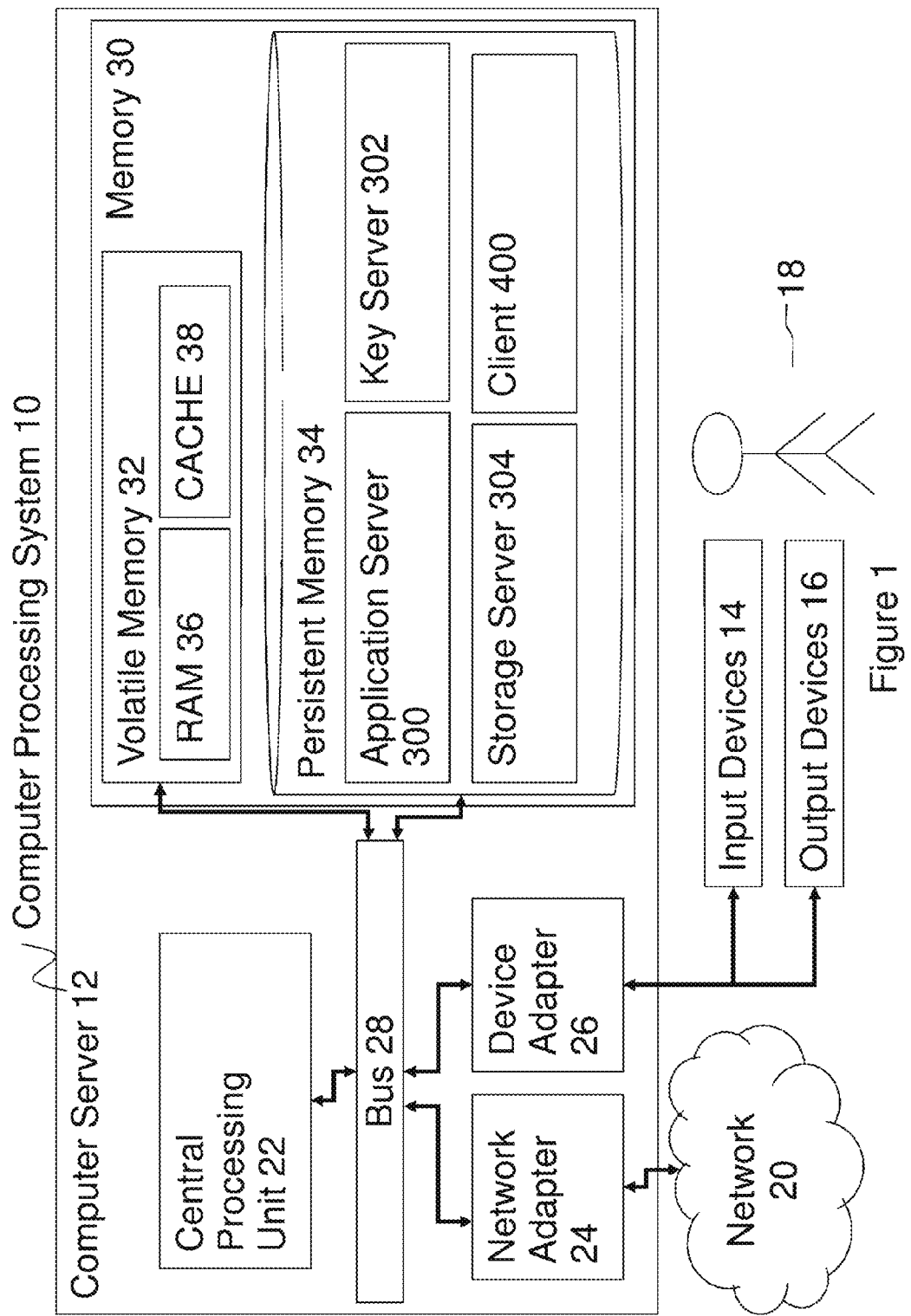
FIG. 1 is a deployment diagram of the preferred embodiment in a computer processing system.

This disclosure relates to a method and apparatus for secure sharing and collaborative editing of documents in cloud based applications.

In a first aspect there is provided a method of collaboratively editing a document in a system of sharee clients including: creating a document change; generating a document token for encrypting the document change; encrypting the document change with the document token; distributing the encrypted document change to the other sharee clients; generating a plurality of copies of the sharee document token; encrypting each sharee document token with a respective sharee's public key; and distributing each encrypted sharee document token to respective sharees whereby each sharee can: decrypt a sharee document token using a respective private key; decrypt the encrypted document change using the share document token; and consolidate the document change into a document on it.

Preferably the encrypted document change is loaded onto one or more servers and made available to share clients.

More preferably the servers are Cloud servers. The server never has access to the original content of the document, just encrypted content and allows collaborative viewing and editing of documents. Documents are stored in the server and as well as the tokens to access them, but these tokens are encrypted with the public key of each user and only can be decrypted with the corresponding private key that is only held by the user and is never sent to the server. Every single piece of the document is protected including but not limited to text, tables, images, links and all the content in a document used in an office suite.

Most preferably, the method further includes forming the share document token by splitting the document token into a server document token and sharee document token whereby each share can combine the decrypted share document token with the server document token; and decrypt the encrypted document using the combined document token.

The plurality of sharees and plurality of sharee document token copies correspond.

Conventional techniques relate to the use of encryption in off-premise data storage or collaborative editing of documents, but the above solution differs from conventional approaches because it permits clients to manage, share and edit confidential documents with other cloud servers at the application level.

The embodiments have a securing effect on a document sharing process because there is no loss of information if the server is compromised even if the attacker steals the server key.

The embodiments have a further securing effect on a document sharing process because each user cannot decrypt the file without the server key, so non-repudiation is preserved.

The preferred embodiment's securing effects operate at the platform level of the server and client whereby standard document editing software executing on the platform of the embodiment and is more secure by virtue of running on the platform.

More advantageously every piece of the document is protected including but not limited to text, tables, images, links and all the content in a document used in an office suite.

Most advantageously the encrypted document is stored in a document server.

Suitably the encrypted tokens are stored in a key server.

Therefore, the complete document token for each document is never stored in the server, just the server document token, so in case of intrusion the attacker will have only half of the token and an encrypted document.

The server never has access to the original content of the document and only the encrypted content, yet the embodiments allow multiple clients to collaboratively view and edit documents.

More suitably the document change is a creation of a new document.

Most suitably the document change is an addition or deletion of content to an existing document.

Viewed from another aspect, the disclosure provides a system for collaboratively editing a document between a plurality of sharee clients including: a document editor for creating a document change; a security engine for generating a document token for encrypting the document change and for encrypting the document change with the document token; a messaging engine for making the encrypted document change available to the other sharee clients; a token manager for generating a plurality of copies of the sharee document token; a second security engine for encrypting each sharee document token with a respective sharee's public key; and said messaging engine further for distributing each encrypted sharee document token to respective sharees whereby each sharee can: decrypt a sharee document token using a respective private key; decrypt the encrypted document change using the share document token; and consolidate the document change into a document.

Preferably, the disclosure provides a system wherein the encrypted document change is loaded onto one or more servers and made available to share clients.

Preferably, the disclosure provides a system wherein the servers are Cloud servers.

Preferably, the disclosure provides a system wherein the share document token is formed by splitting the document token into a server document token and sharee document token whereby each share can combine the decrypted share document token with the server document token and decrypt the encrypted document using the combined document token.

Preferably, the disclosure provides a system wherein the plurality of sharees and plurality of sharee document token copies correspond to the same number N.

Preferably, the disclosure provides a system wherein every piece of the document is protected including but not limited to text, tables, images, links and all the content in a document used in an office suite.

Preferably, the disclosure provides a system wherein the encrypted document is stored in a document server.

Preferably, the disclosure provides a system wherein the encrypted tokens are stored in a key server.

In a third aspect there is provided a computer program product for collaborative editing a document in a system of sharee clients, the computer program product includes a computer-readable storage medium having computer-readable program code embodied therewith. The computer-readable program code is configured to perform the method as described above.

The computer program product includes a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect there is provided a computer program stored on a computer readable medium and loadable into the internal memory of a digital computer, including software code portions, when said program is run on a computer, for performing the method of as described above.

In a fifth aspect there is provided a data carrier aspect of the preferred embodiment that includes functional computer data structures that, when loaded into a computer system and operated upon thereby, enable said computer system to perform all the steps of the method. A suitable data-carrier could be a solid-state memory, magnetic drive or optical disk. Channels for the transmission of data may likewise include storage media of all descriptions as well as signal-carrying media, such as wired or wireless signal-carrying media.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 includes computer server 12 and one or more input devices 14 and output devices 16 directly attached to the computer server 12. Computer processing system communicates with a user 18 using input devices 14 and output devices 16. Input devices 14 include one or more of: a keyboard, a scanner, a mouse, trackball or another pointing device. Output devices 16 include one or more of a display or a printer. Computer processing system communicates with network devices (not shown) over network 20. Network 20 can be a local area network (LAN), a wide area network (WAN), or the Internet.

Computer server 12 includes the following components: central processing unit (CPU) 22, network adapter 24; device adapter 26; bus 28 and memory 30.

CPU 22 loads a machine instruction from memory 30 and performs a machine operation in response to the instruction. Such machine operations include: increment or decrement a value in a CPU 22 register (not shown); transfer a value from memory 30 to a CPU 22 register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to as a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 20 and input devices 14 and output devices 16.

Bus 28 couples the main system components together. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

In the preferred embodiment, the set of computer program modules configured to carry out the functions of the embodiments include: application server 300; key server 302; storage server 304; and client 400. Further program modules that support the preferred embodiment but are not shown include firmware, boot strap program, operating system, and support applications. Each of the operating system, support applications, other program modules, and program data or some combination thereof, may include an implementation of a networking environment.

It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
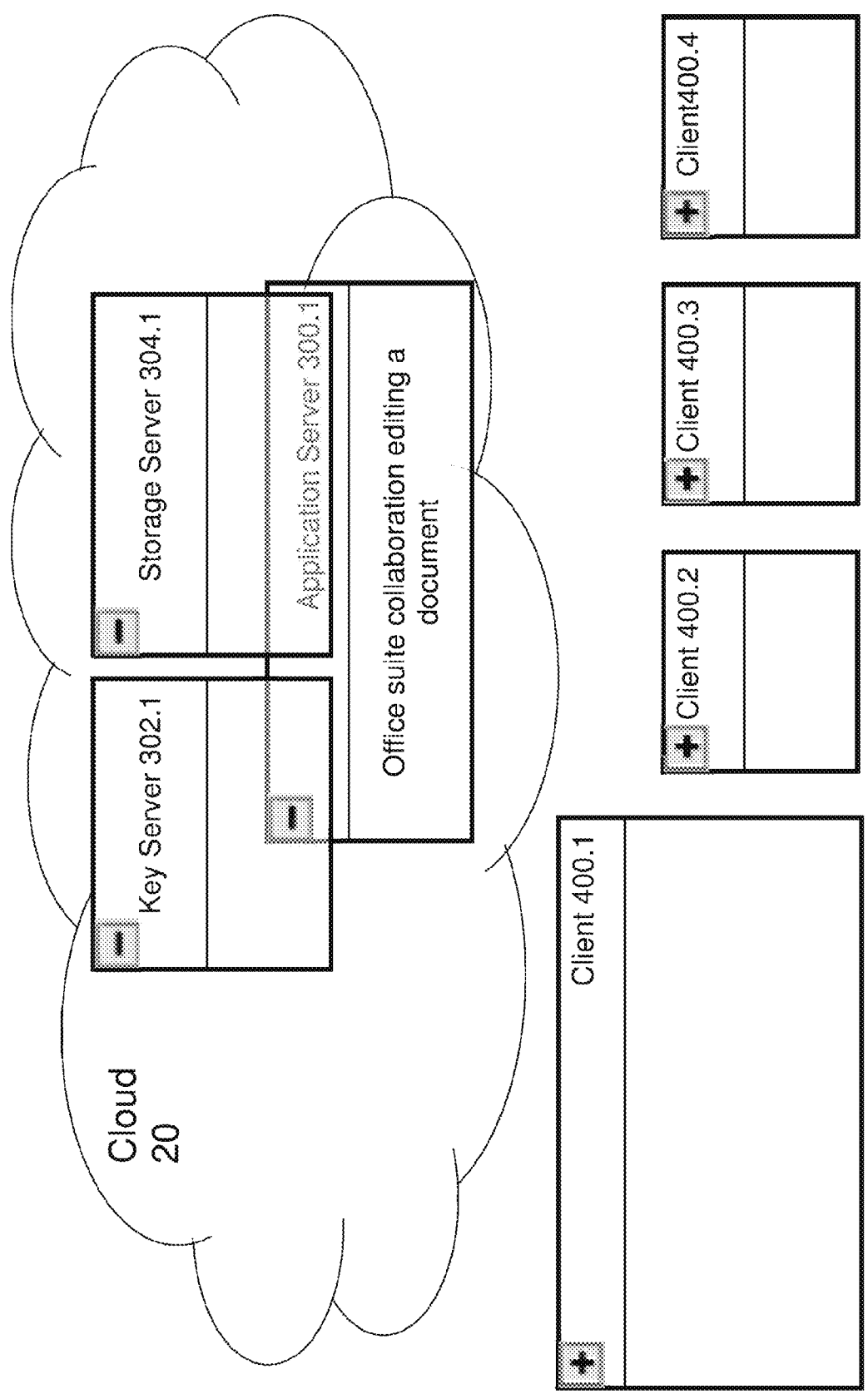
FIG. 2 is a deployment diagram of the preferred embodiment during executing in a Cloud network.

Referring to FIG. 2, a deployment of the preferred embodiment during execution in the Cloud 20 comprises four clients (400.1; 400.2; 400.3 and 400.4) enabled for communication with application server 300.1; key server 302.1; storage server 304.1. Clients and servers are instantiations of application server 300; key server 302; storage server 304; and client 400 of computer processing system 10.

Figure 3:
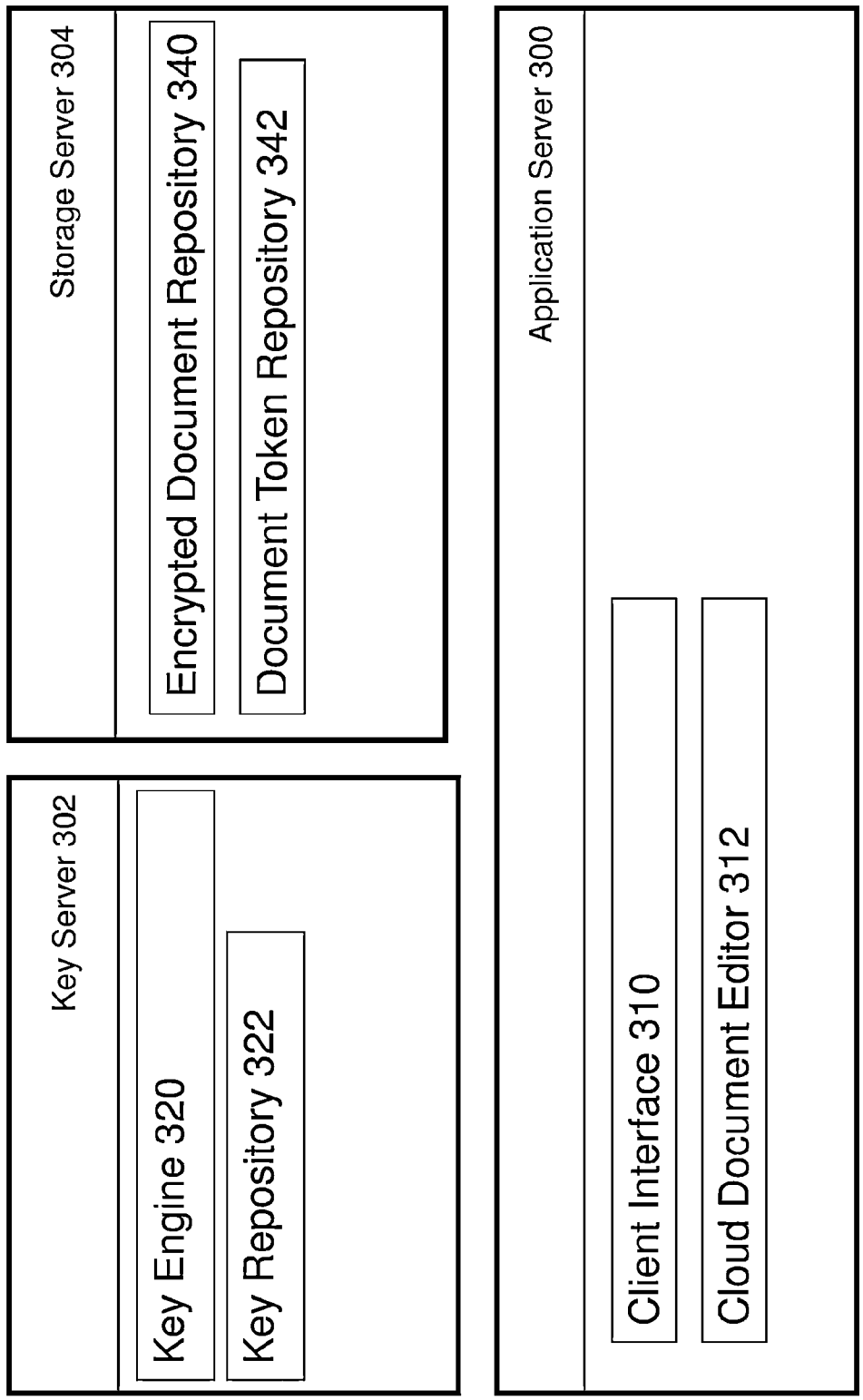
FIG. 3 is a component diagram of the servers of the preferred embodiment.

Referring to FIG. 3, the components of application server 300, key server 302 and storage server 304 are described.

Application server 300 includes client interface 310 and cloud document editor 312.

Client interface 310 is for communicating with clients that want to create, share and view documents.

Cloud document editor 312 is an example Cloud application, in this example a document editor, downloaded by a client to operate on a downloaded Cloud document.

Key server 302 includes a key engine 320 and a key repository 322.

Key engine 320 is for managing the storing and transferring of keys from the key repository 322.

Key repository 322 is for storing client public keys.

Storage server 304 includes encrypted document repository 340 and document token repository 342.

Encrypted document repository 340 is for storing encrypted documents for access by application server 300.

Document token repository 342 stores document tokens needed to decrypt the encrypted document.

Figure 4:
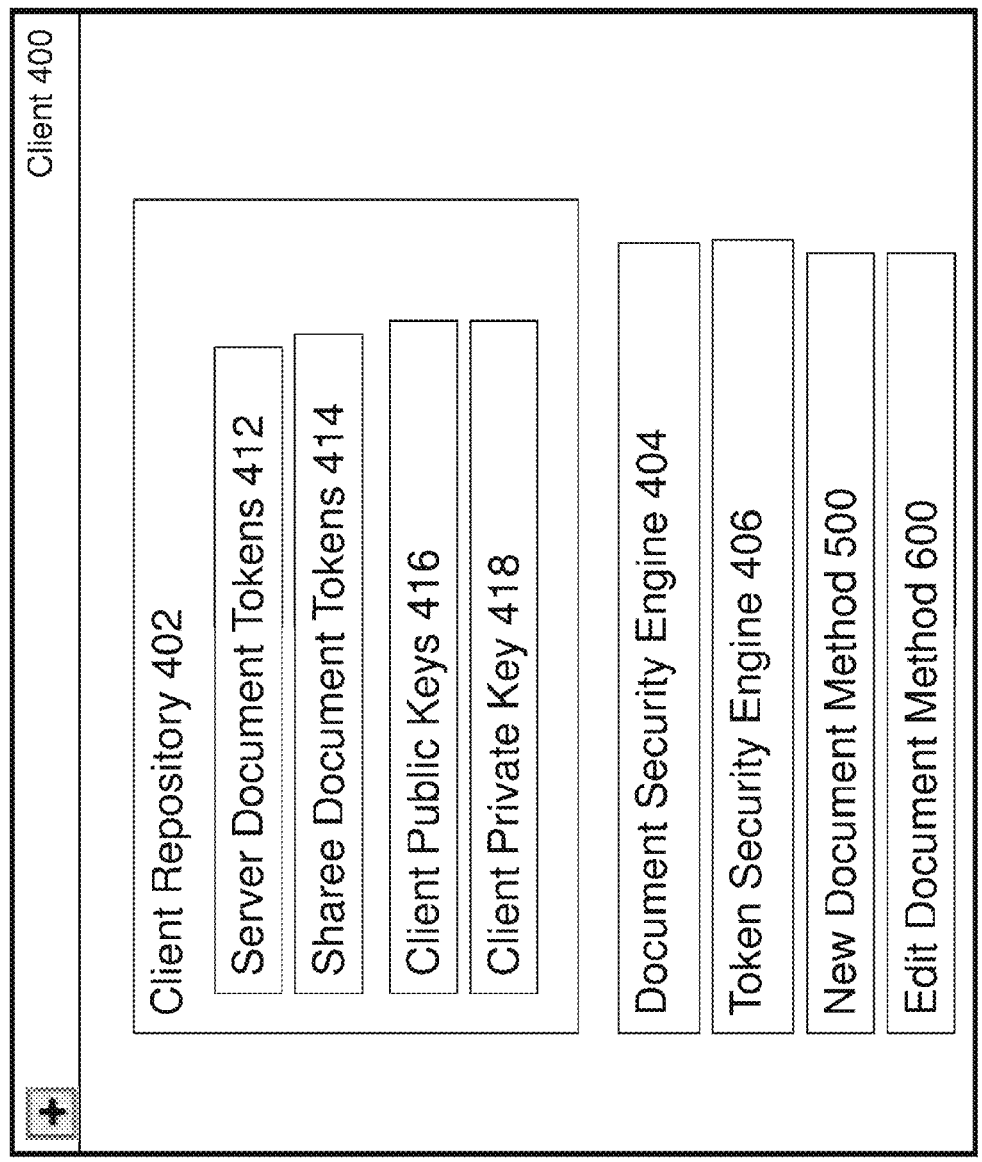
FIG. 4 is a component diagram of a client of the preferred embodiment.

Referring to FIG. 4, client 400 includes: client repository 402; document security engine 404; token security engine 406; new document method 500; and edit document method 600.

Client repository 402 is for storing artifacts used in the client methods and includes: one or more server document tokens 412; one or more share document tokens 414; one or more client public keys 416 and a private key 418 for the client.

Document security engine 404 is for encrypting and decrypting a document. The engine is called with a reference to a document, a reference to a token and whether encryption or decryption is required.

Token security engine 406 is for encrypting and decrypting a token.

New document method 500 is described in further detail below with reference to FIG. 5.

Edit document method 600 is described in further detail below with reference to FIG. 6.

Figure 5:
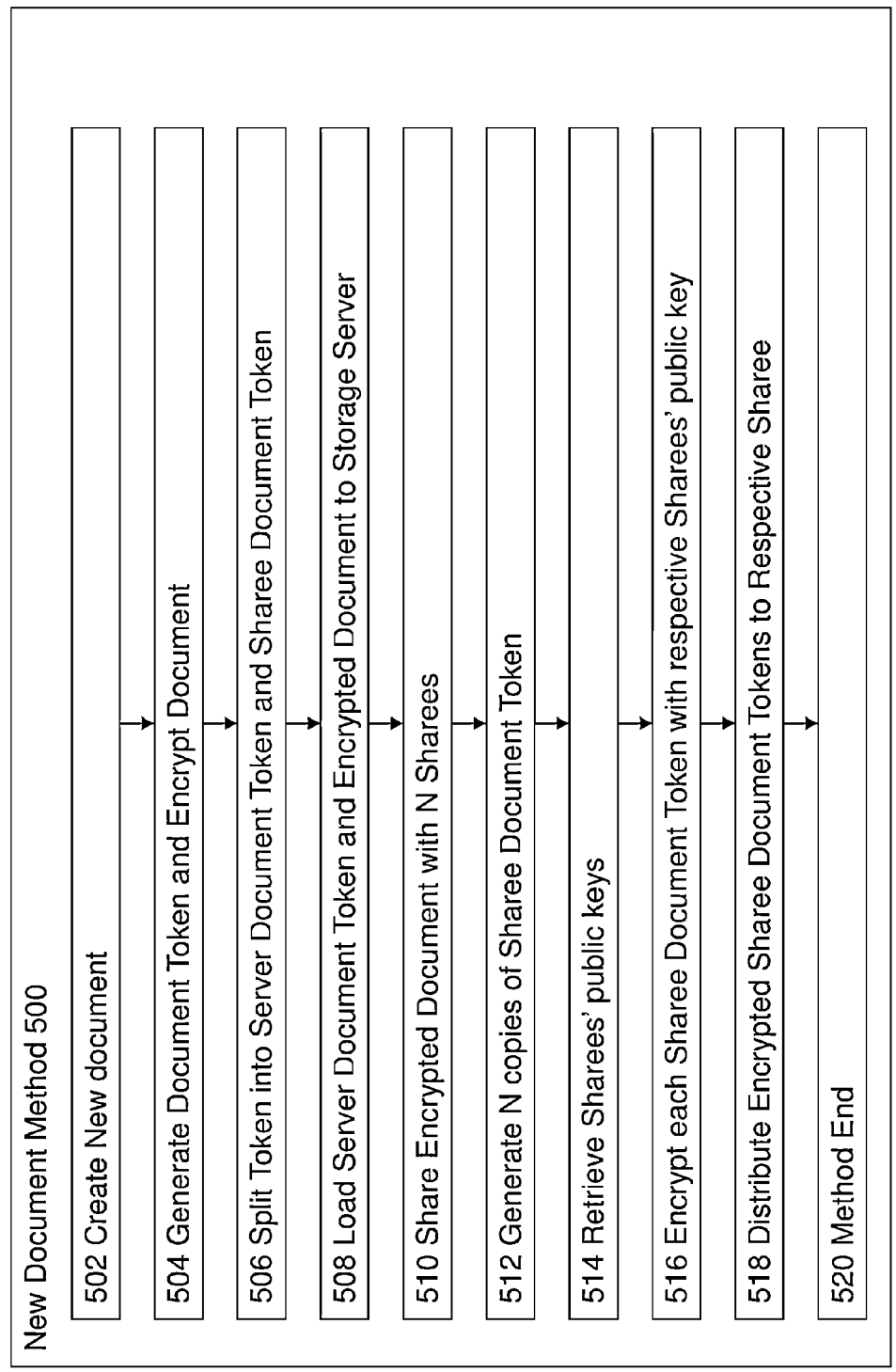
FIG. 5 is a flow diagram of a new document method of the preferred embodiment.

Referring to FIG. 5, new document method 500 includes logical process steps 502 to 520.

Step 502 is for creating a new document.

Step 504 is for generating a document token and for encrypting the new document.

Step 506 is for splitting the token into a server document token and a sharee document token.

Step 508 is for loading the server document token and encrypted document into storage server 304.

Step 510 is for sharing the encrypted document with a plurality (for example N) sharees.

Step 512 is for generate a plurality (for example N) copies of the sharee document token.

Step 514 is for retrieving the sharees' public keys.

Step 516 is for encrypting each sharee document token with respective sharees' public key Step 518 is for distributing encrypted sharee document tokens to respective sharees.

Step 520 is the end of method 500 whereby control is returned to the calling entity.

Figure 6:
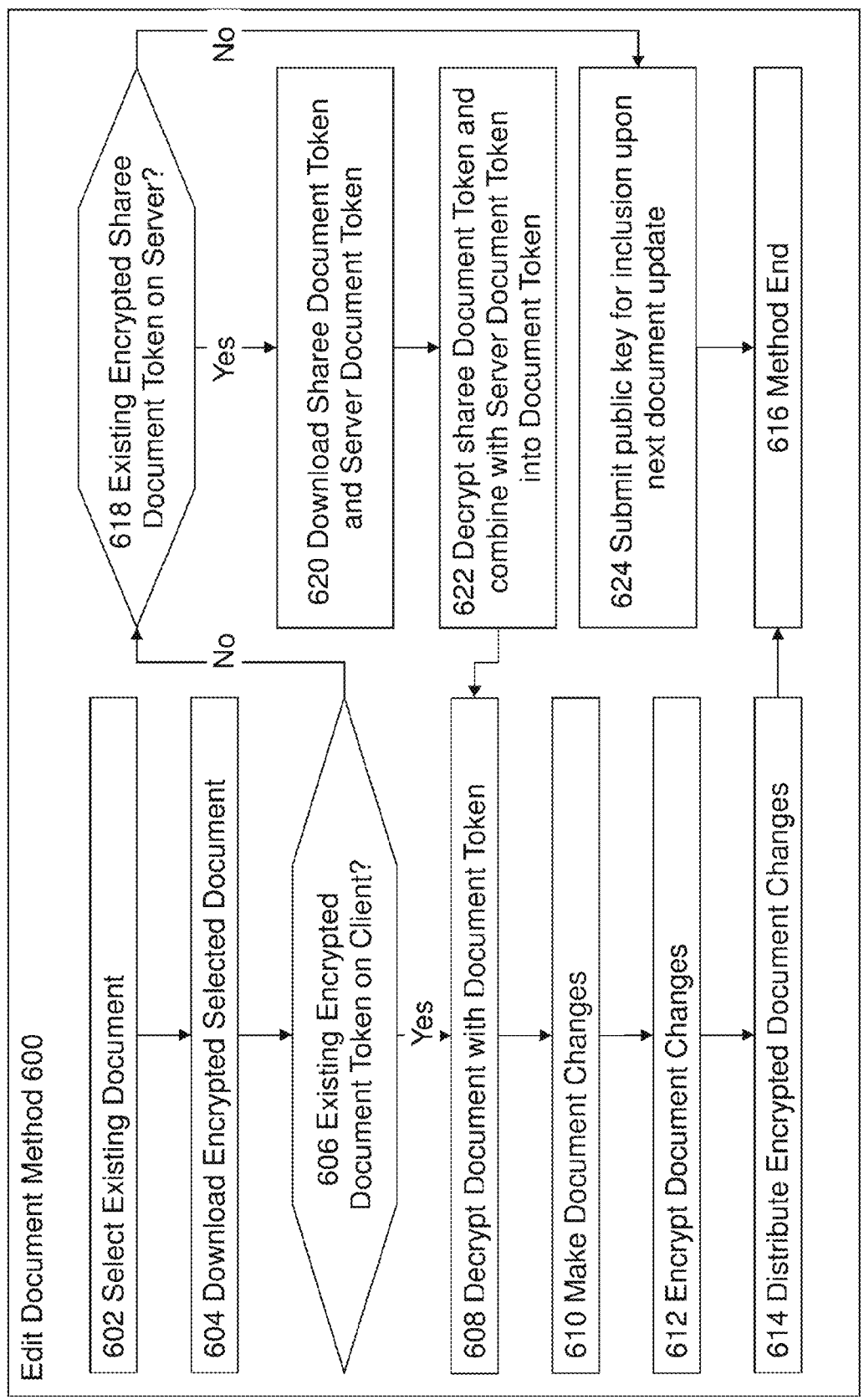
FIG. 6 is a flow diagram of an edit document method of the preferred embodiment.

Referring to FIG. 6, edit document method 600 includes logical process steps 602 to 624.

Step 602 is for selecting an existing document.

Step 604 is for downloading the encrypted selected document.

Step 606 is for determining whether there is an existing encrypted document token in the client repository 402. If so then the process continues at step 608 else the process continues at step 618.

Step 608 is for decrypting the document with the determined document token in the client repository 402.

Step 610 is for making document changes using downloaded document editor 312.

Step 612 is for encrypting the document after the changes have been made.

Step 614 is for loading the changed encrypted document to back to storage server 304.

Step 616 is an end point of method 600.

Step 618 is reached if no existing encrypted document token is found on the client. Step 618 is for determining if there is an existing encrypted sharee document token on the server and moving to step 620 if so. Else, if no token is found on the storage server 304, the method continues at step 624.

Step 620 is for downloading the existing sharee document token and the corresponding server document token.

Step 622 is for decrypting the downloaded sharee document token with the client private key and for combining with the corresponding server document token to form a document token. The method continues on to step 608 for decrypting the document with the newly combined document token.

Step 624 is reached when no existing encrypted share document token is located in the server storage. Step 624 is for submitting the client public key to the server application and requesting access to editing the document. After access is granted by an administrator then a document token will be created for the client. The method ends at step 616.

Figure 7A:
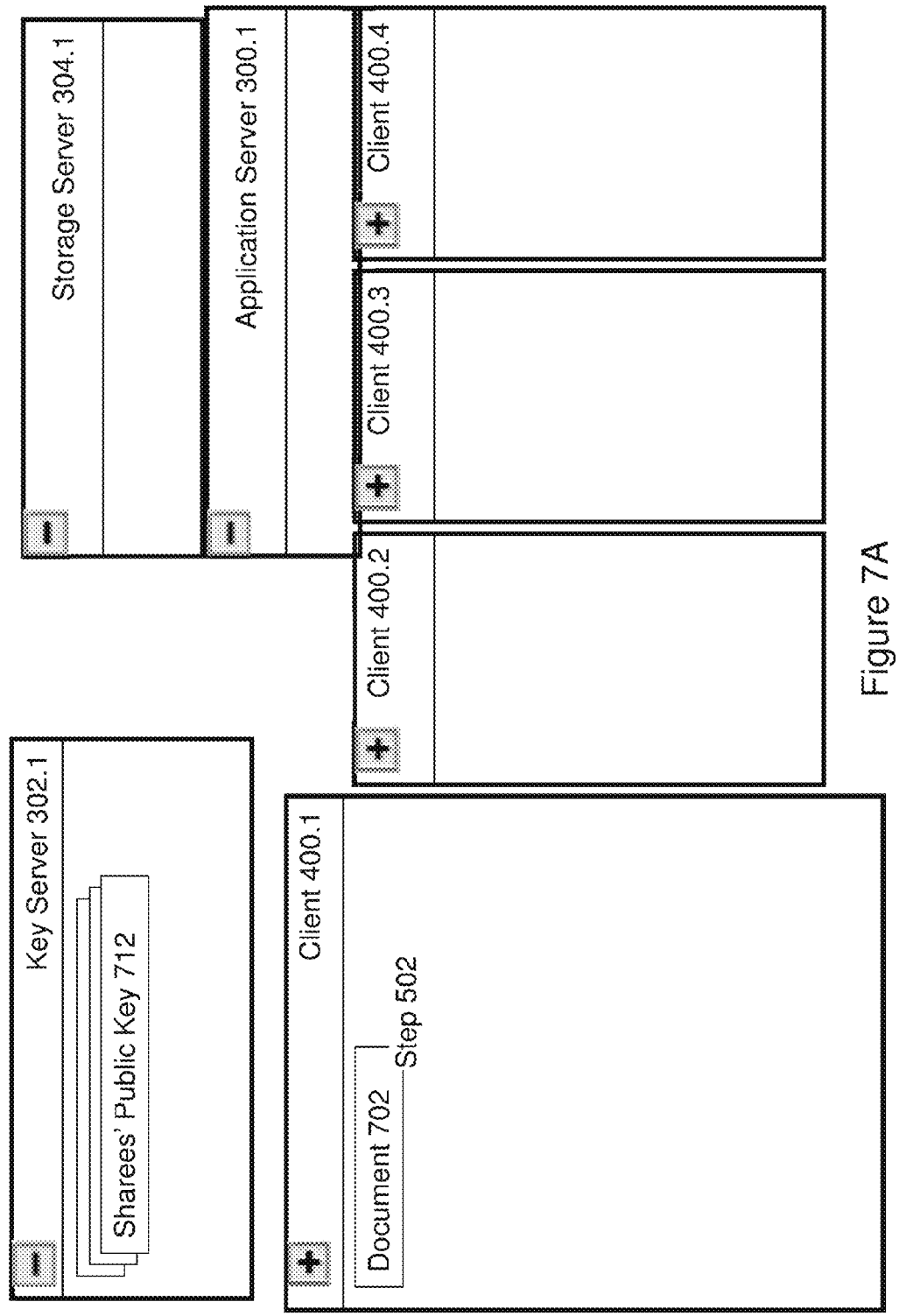
FIG. 7A to 7P are example client and server states during creation and editing of a document.
Figure 7B:
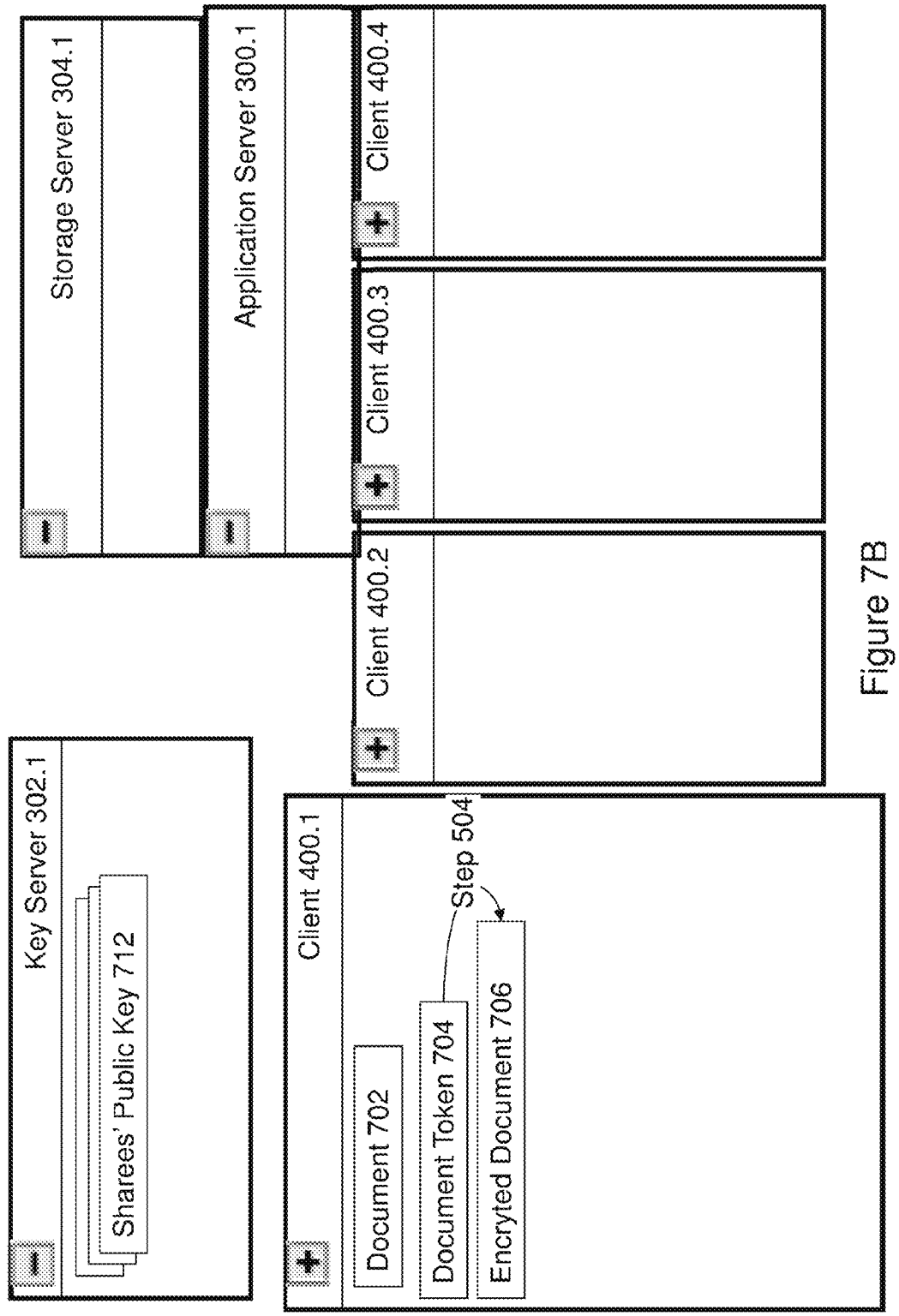
Figure 7C:
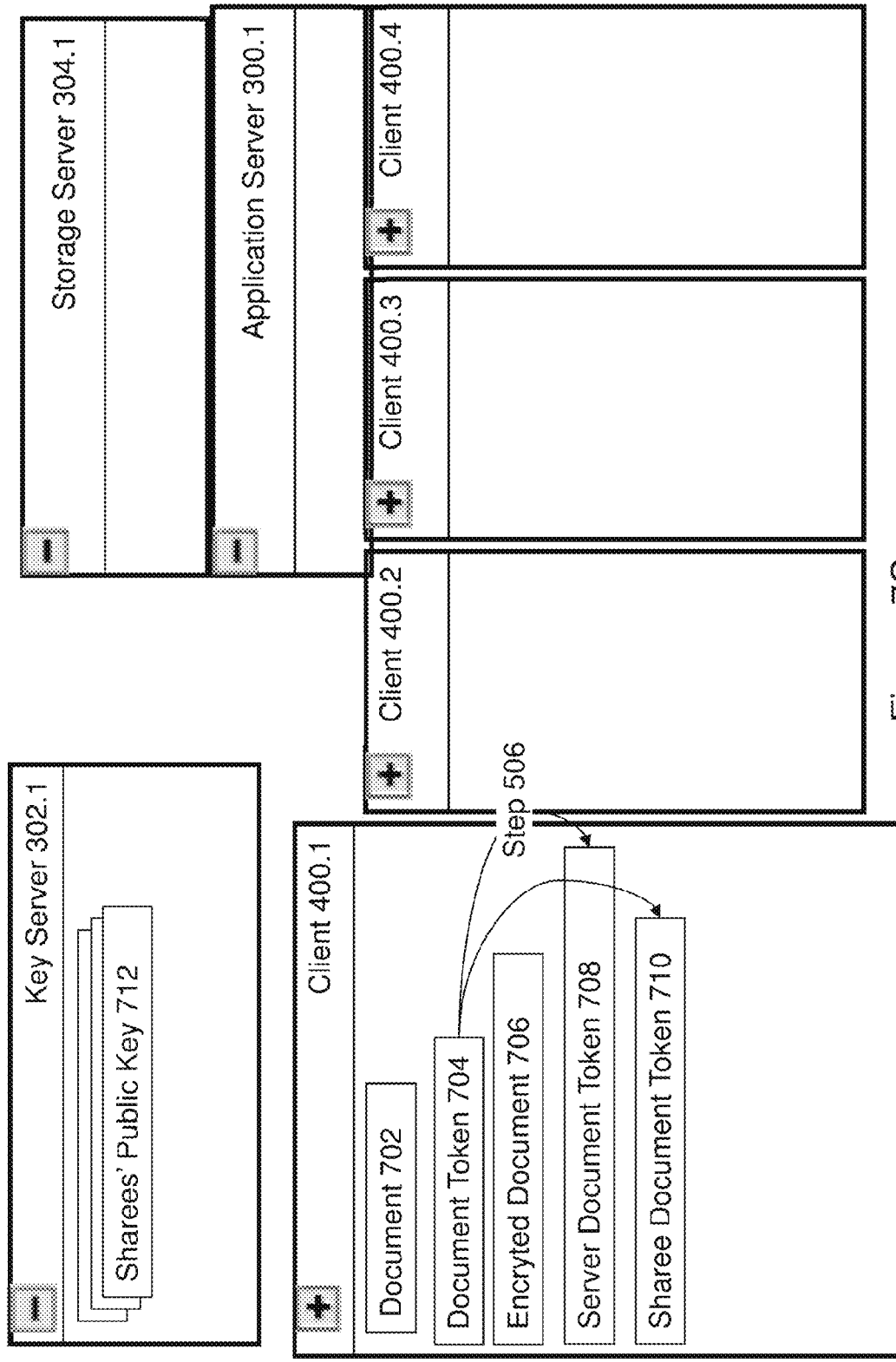
Figure 7D:
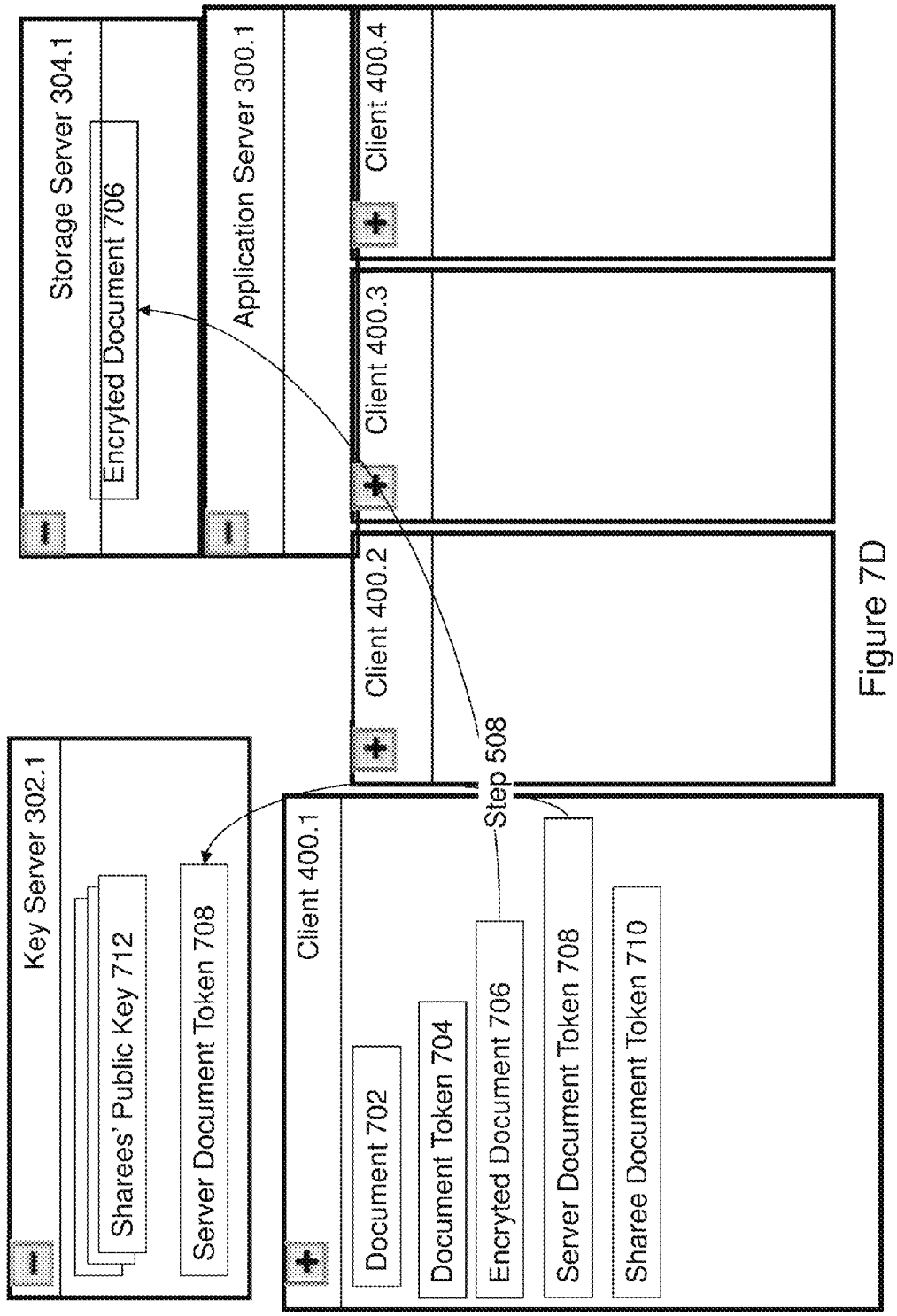
Figure 7E:
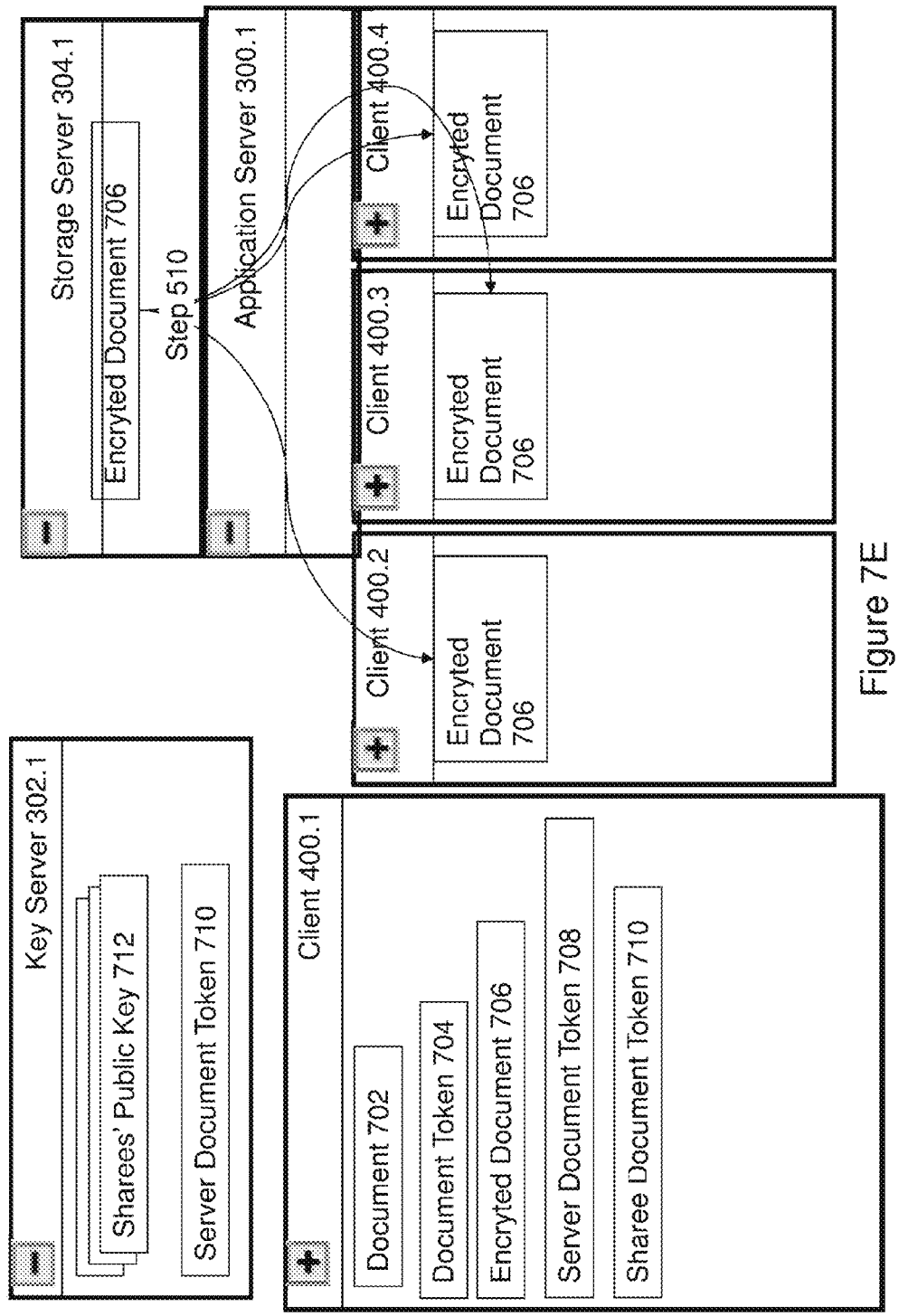
Figure 7F:
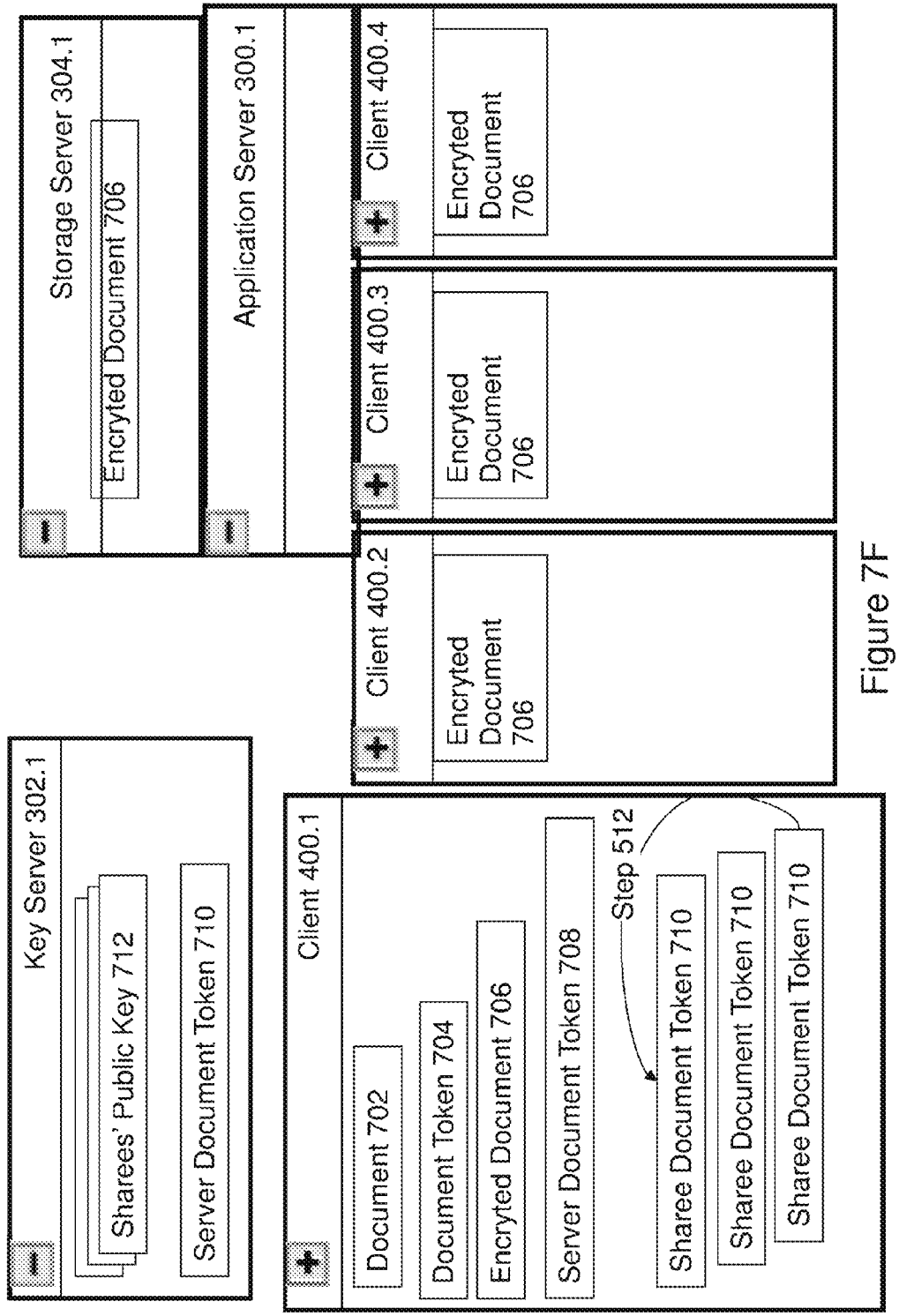
Figure 7G:
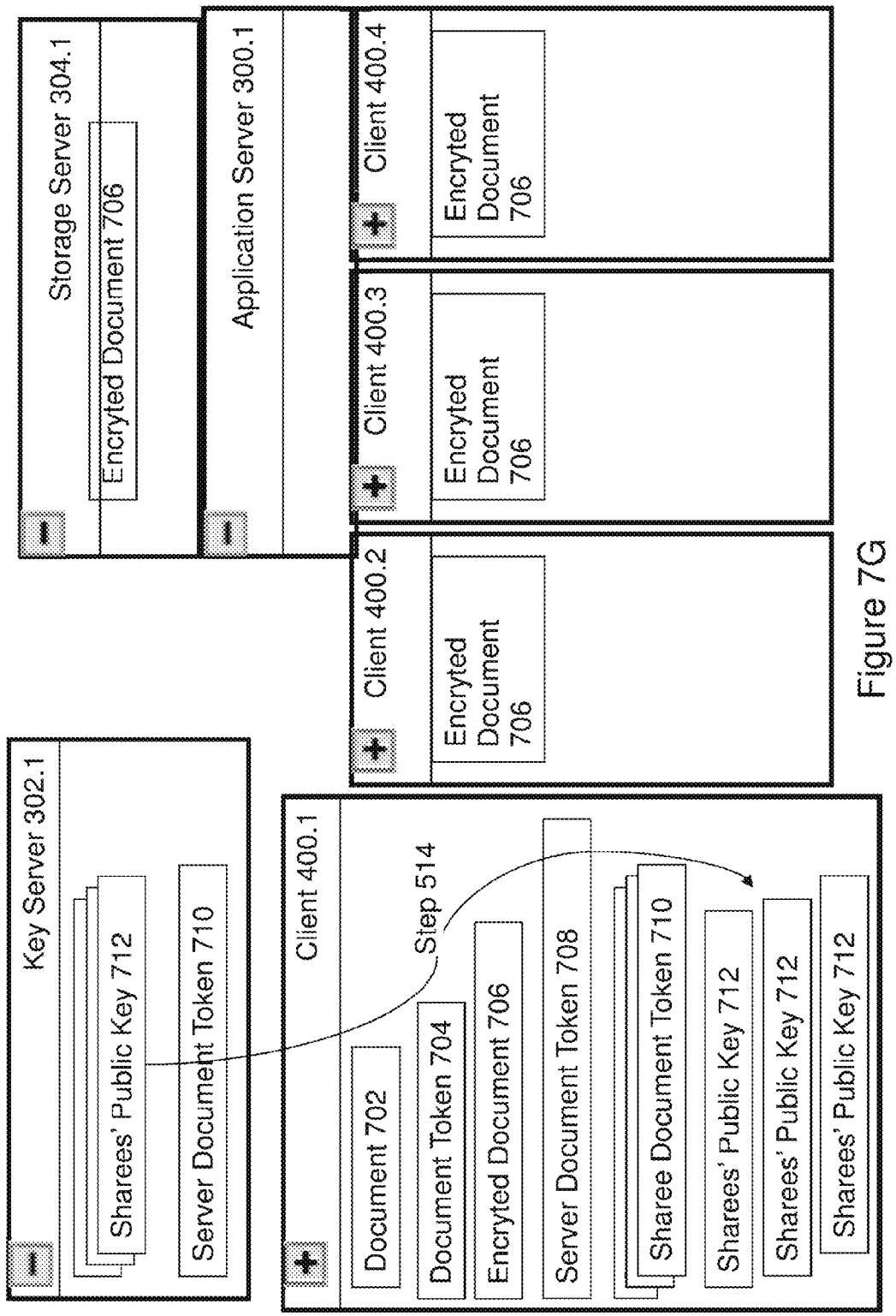
Figure 7H:
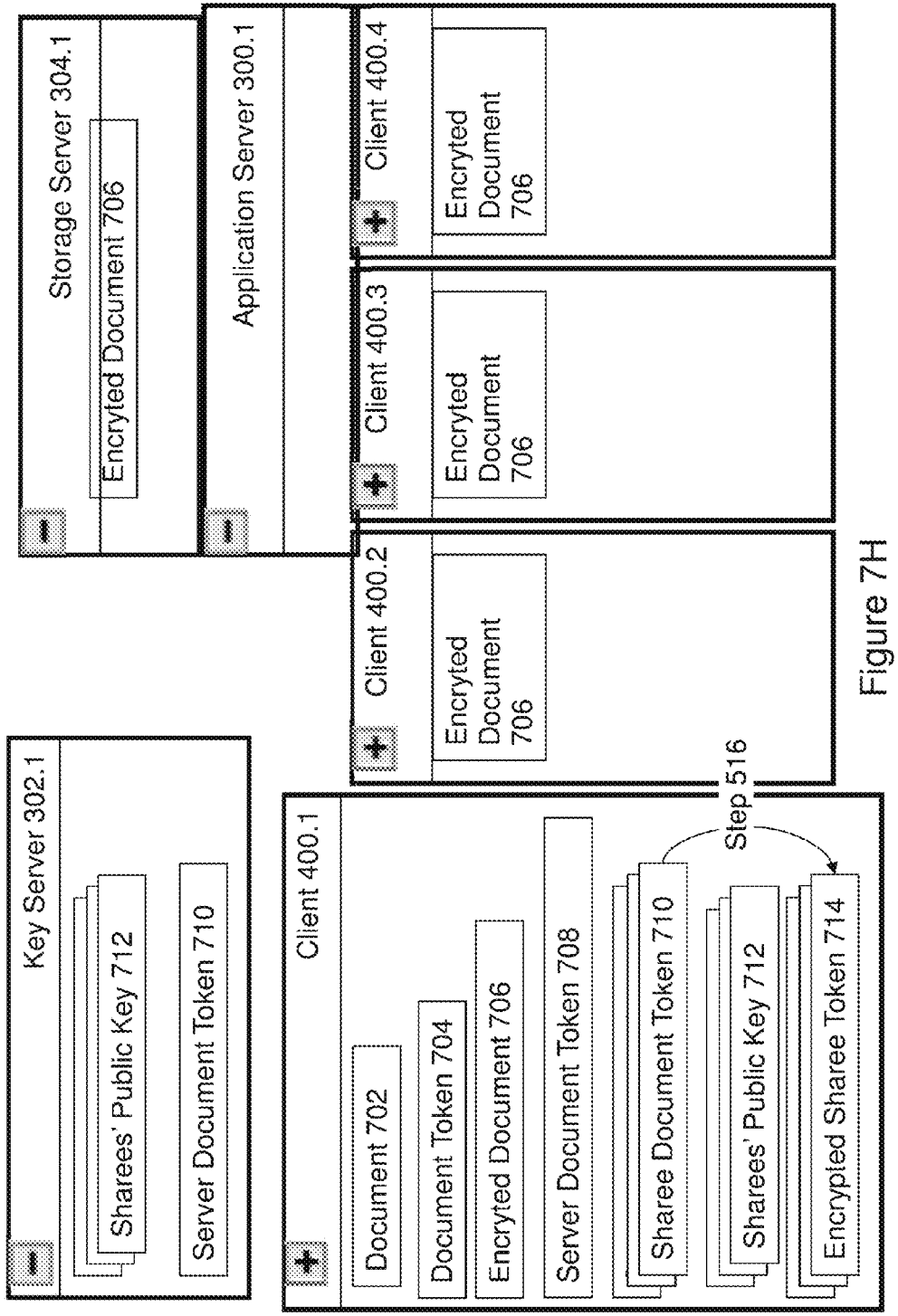
Figure 7I:
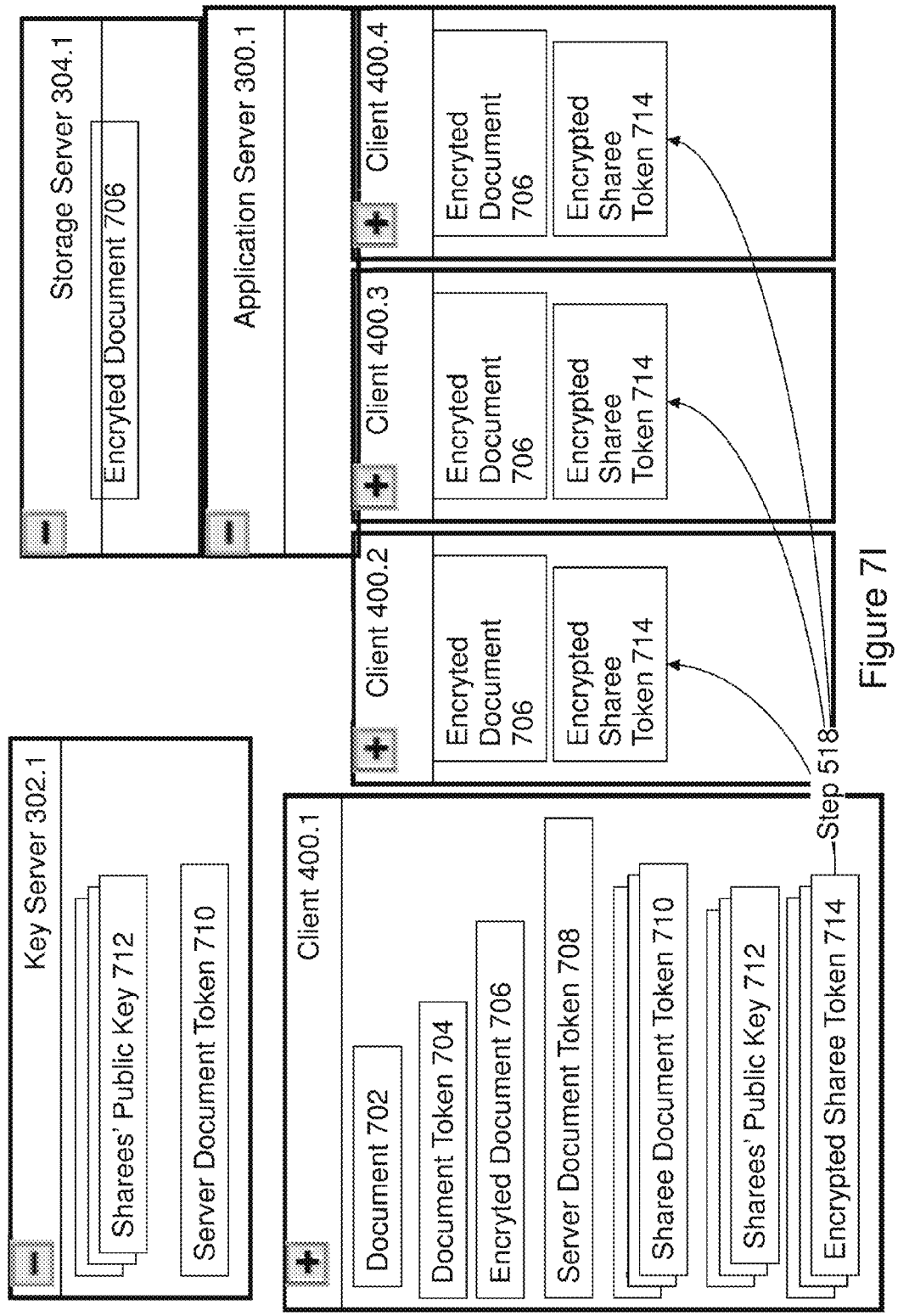
Figure 7J:
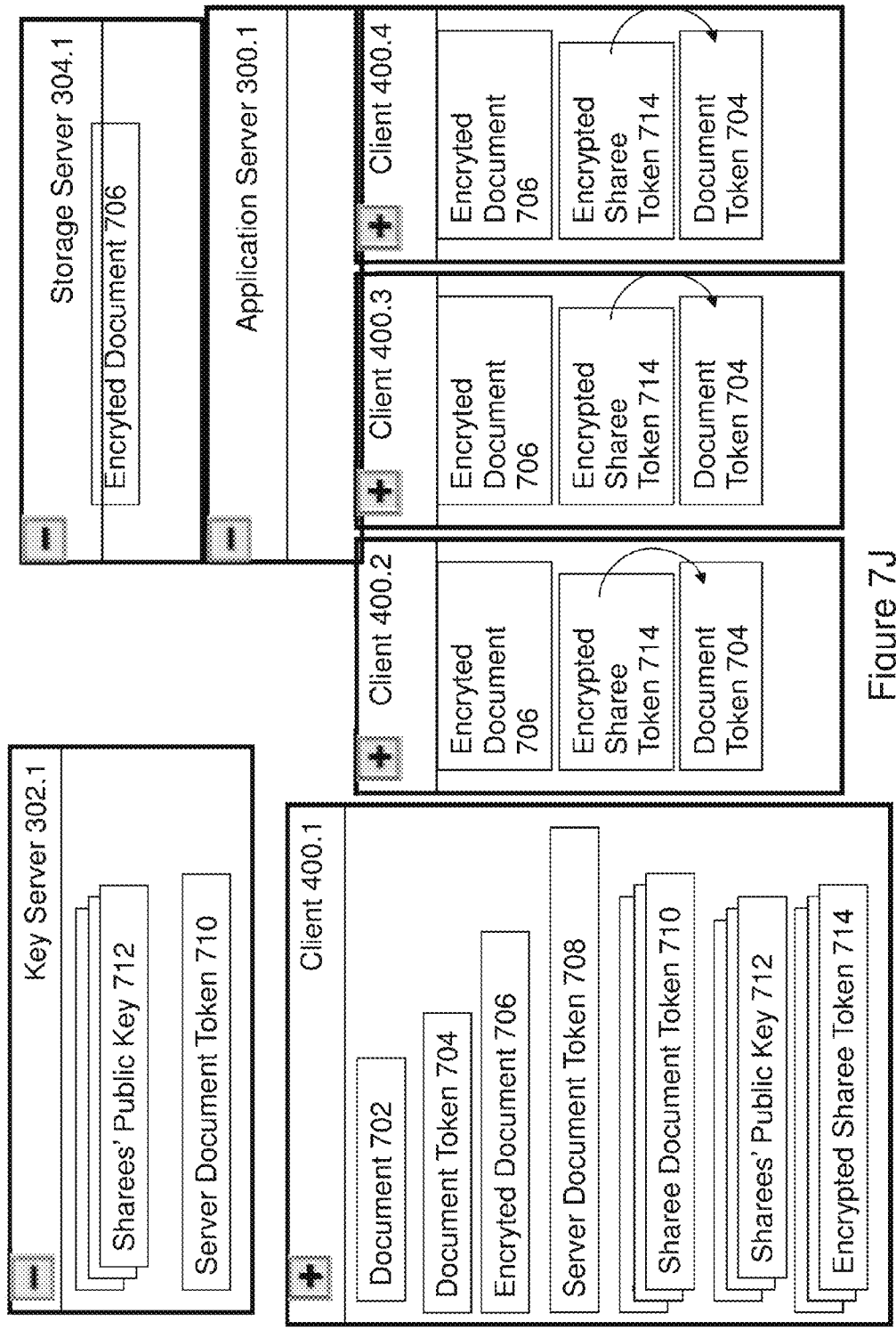
Figure 7K:
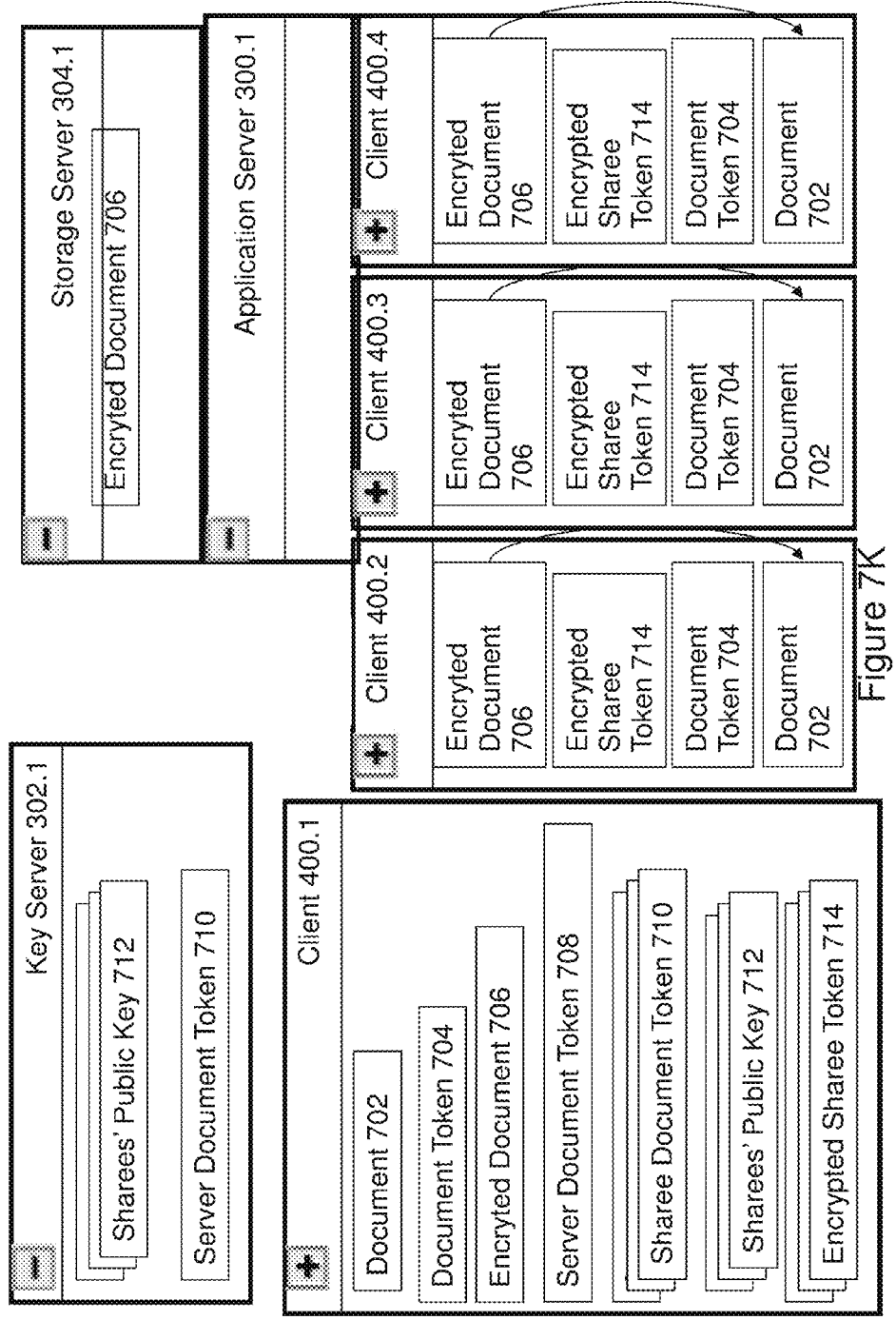
Figure 7L:
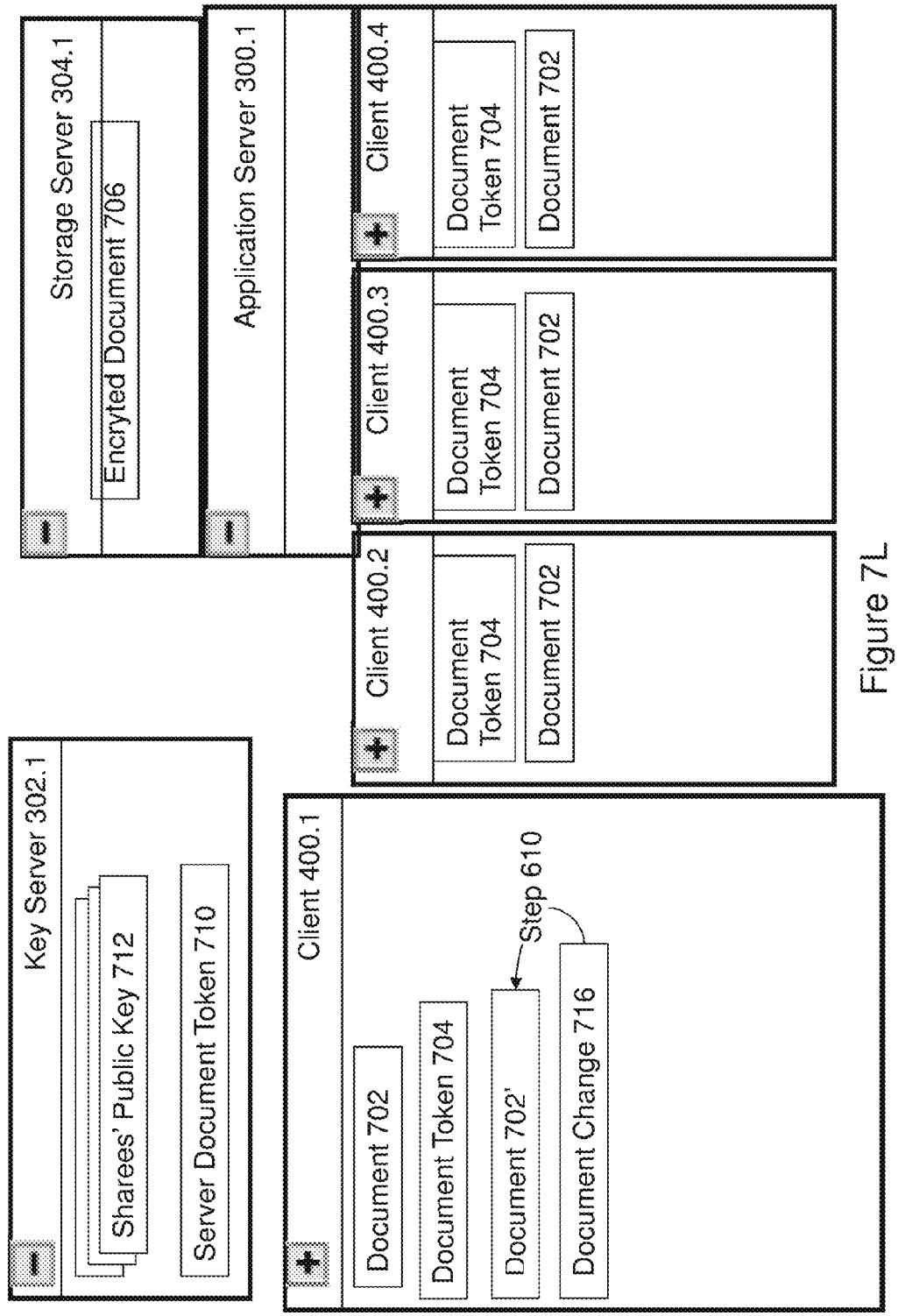
Figure 7M:
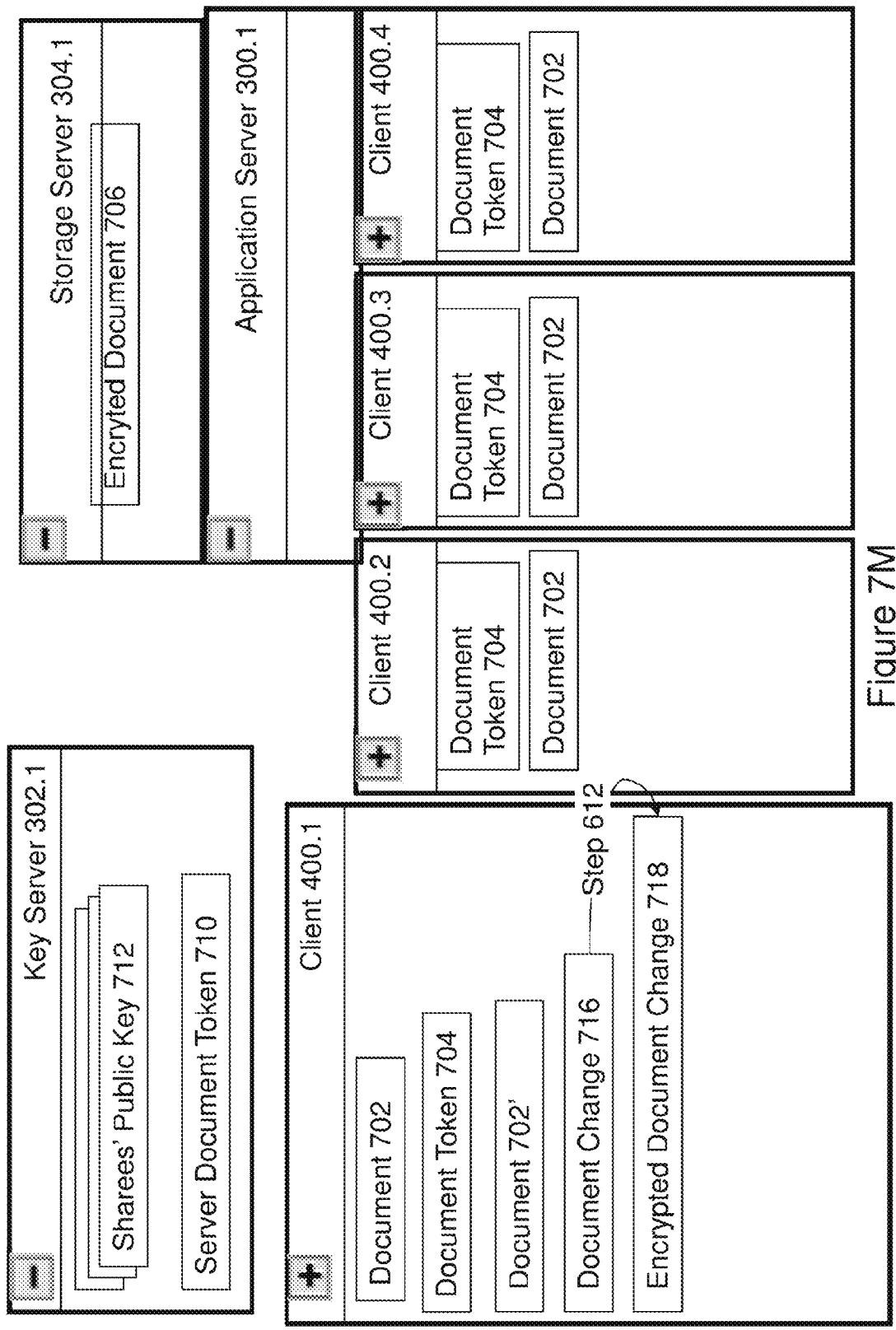
Figure 7N:
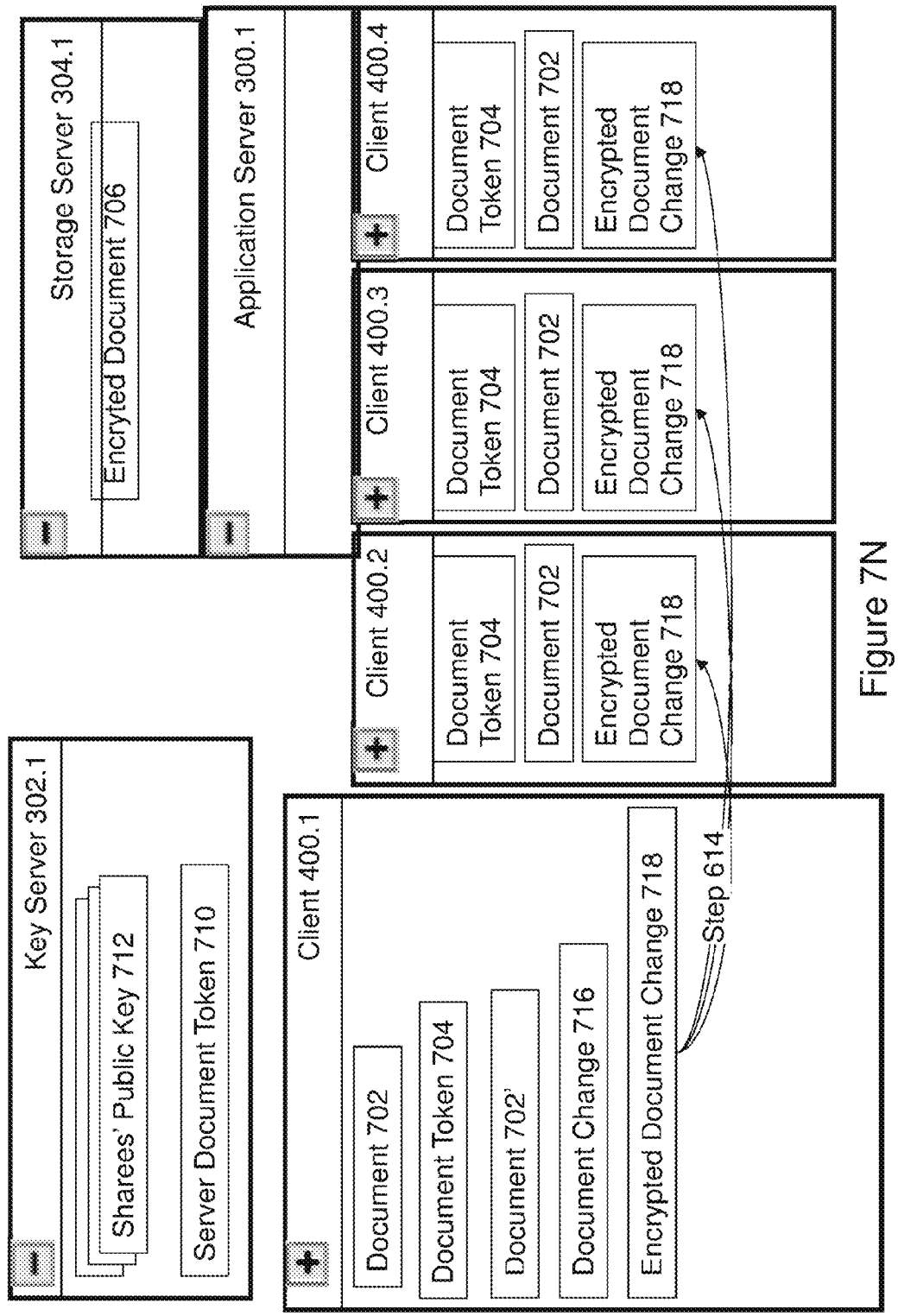
Figure 7O:
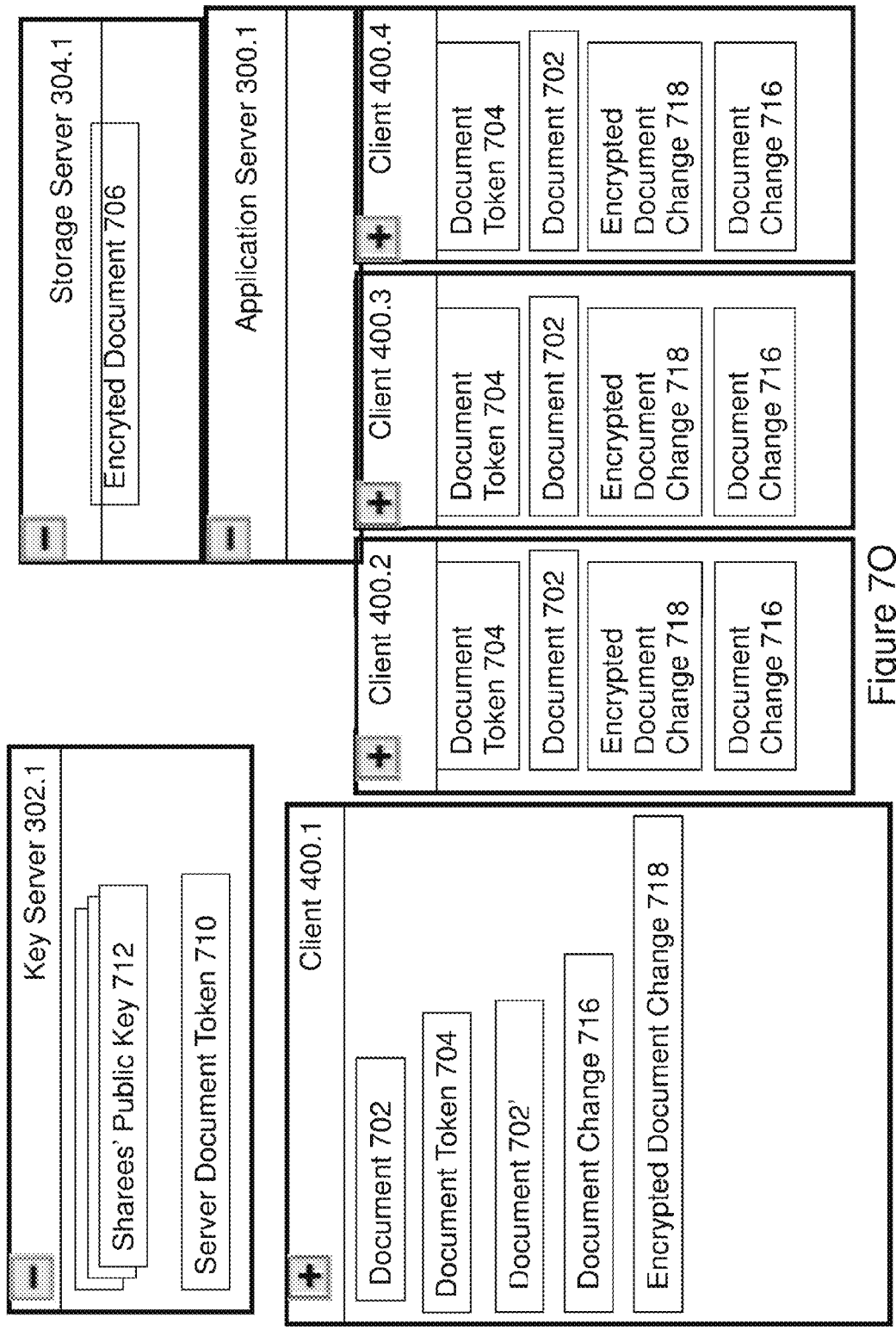
Figure 7P:
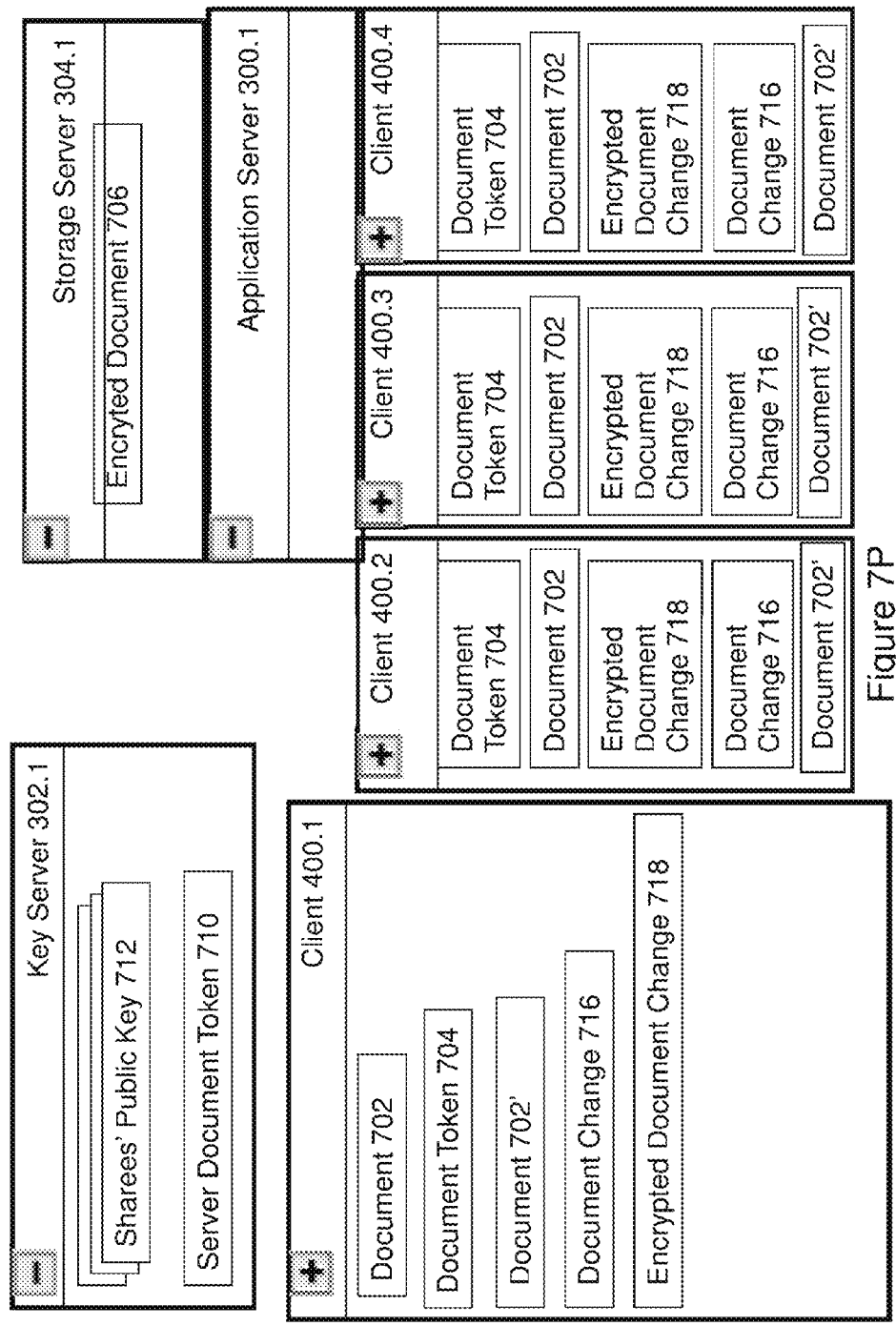

Referring to FIG. 7A to 7P, states of an example collaborative editing process are described for clients 400.1, 400.2, 400.3, 400.4, application server 300.1, key server 302.1, and storage server 304.1.

In FIG. 7A, client 400.1 creates (step 502) a document 702 on client 400.1. A user wants to share the document with clients 400.2, 400.3 and 400.4. In an initial state, key server 302.1 holds a set of public keys 712 for the clients.

In FIG. 7B, client 400.1 generates (step 504) a document token 704 and then encrypts the document to form an encrypted document 706.

In FIG. 7C, client 400.1 splits (step 506) document token 704 into a server document token 708 and sharee document token 710.

In FIG. 7D, client 400.1 loads (step 508) server document token 708 to key server 302.1 and encrypted document 706 to storage server 304.1.

In FIG. 7E, client 400.1 shares (step 510) encrypted document 706 with clients 400.2, 400.3 and 400.4.

In FIG. 7F, client generates (step 512) three copies of sharee document token 710.

In FIG. 7G, client 400.1 retrieves (step 514) the sharees' public keys from the key store.

In FIG. 7H, client 400.1 encrypts (step 516) each sharee document token with the retrieved share public key of one of the clients 400.2, 400.3 and 400.4.

In FIG. 7I, client 400.1 distributes (step 518) the encrypted sharee document tokens to each of the clients 400.2, 400.3 and 400.4

In FIG. 7J, each client 400.2, 400.3 and 400.4 receives and decrypts an encrypted sharee document token; then combines it with a server document token to form a document token 704.

In FIG. 7K, clients 400.2, 400.3 and 400.4 download the encrypted document and respectively use the document token to decrypt the encrypted document to form the document 702.

Although the above example describes the creation of a new document, subsequent change to the document can be encrypted and decrypted in the same way. Document changes are then broadcast to clients viewing/editing the same document as described with reference to the next state figures.

In FIG. 7L, client 400.1 makes (step 610) a document change 716 such that new document 702' is created.

In FIG. 7M, client 400.1 encrypts (step 612) document change 716 to form encrypted document change 718.

In FIG. 7N, client 400.1 distributes (step 614) encrypted document change 718 to clients 400.2, 400.3 and 400.4.

In FIG. 7O, clients 400.2, 400.3 and 400.4 decrypt the encrypted document change 718 to render document change 716.

In FIG. 7P, clients 400.2, 400.3 and 400.4 merge document change 716 to render an updated document 702'.

Further embodiments of the invention are now described. It will be clear to one of ordinary skill in the art that all or part of the logical process steps of the preferred embodiment may be alternatively embodied in a logic apparatus, or a plurality of logic apparatus, including logic elements arranged to perform the logical process steps of the method and that such logic elements may include hardware components, firmware components or a combination thereof.

It will be equally clear to one of skill in the art that all or part of the logic components of the preferred embodiment may be alternatively embodied in logic apparatus including logic elements to perform the steps of the method, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service including steps of deploying computer program code operable to, when deployed into a computer infrastructure and executed thereon, cause the computer system to perform all the steps of the method.

It will be appreciated that the method and components of the preferred embodiment may alternatively embodied fully or partially in a parallel computing system comprising two or more processors for executing parallel software.

Figure 8:
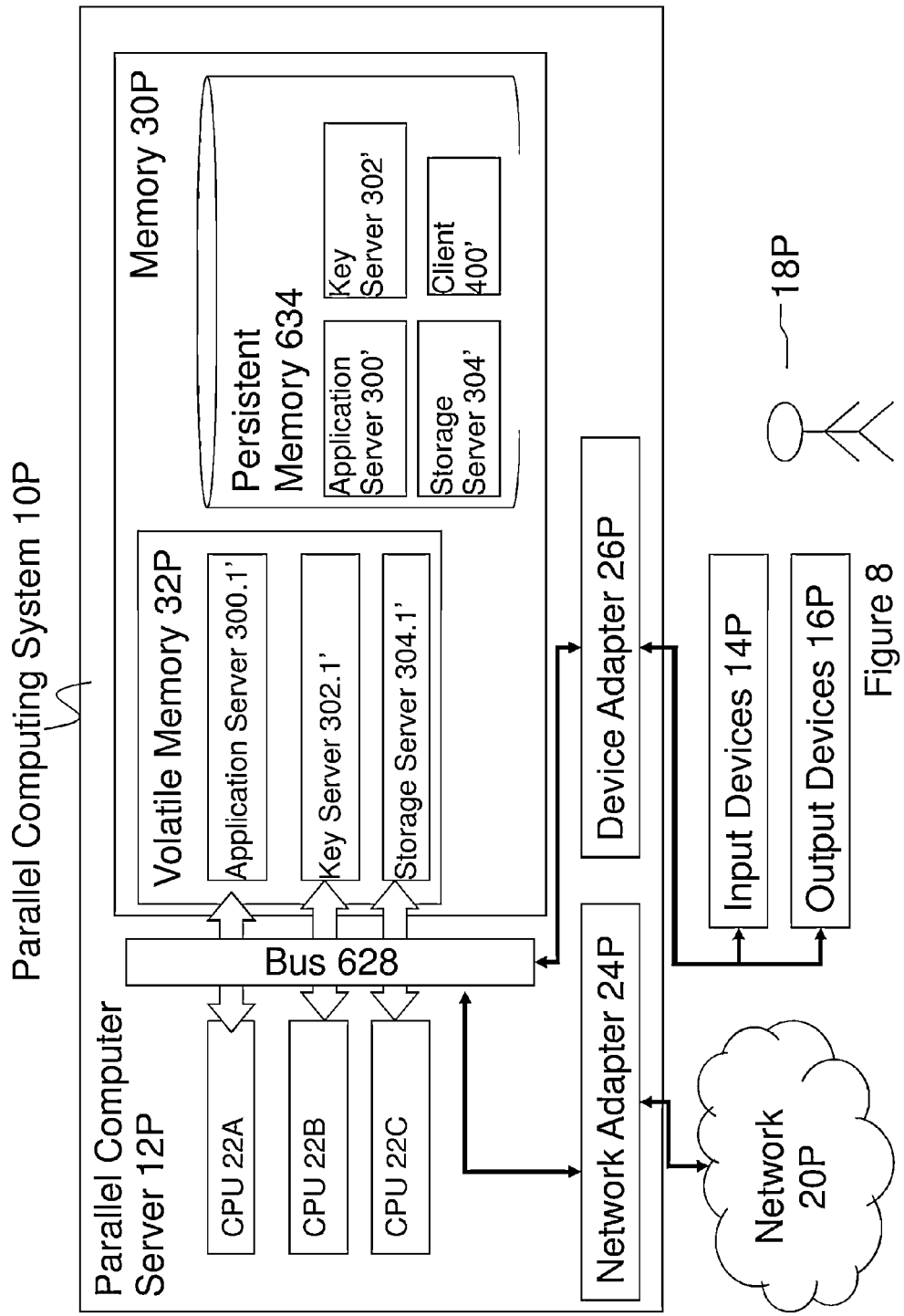
FIG. 8 is a deployment diagram of a parallel computing embodiment.

Referring to FIG. 8, an example parallel computing embodiment may be described in the general context of parallel computer system executable instructions, such as parallel program modules, being executed by parallel computing system 10P. Generally, parallel program modules may include routines, programs, objects, components, logic, data structures, that perform particular tasks or implement particular abstract data types. Parallel computing system 10P includes: parallel computer server 12P; input devices 14P and output devices 16P. Parallel computing system 10P communicates with user 18P via input devices 14P and output devices 16P. User 18P provides input and receives output from the parallel computing system 10P but is not part of parallel computing system 10P.

Parallel computing system 10P communicates with network devices (not shown) over network 20P.

Parallel computer server 12P includes: CPU 22A, CPU 22B; network adapter 24P; device adapter 26P; bus 28P and memory 30P.

Device adapter 26P provides the gateway between the parallel computer server 12P and input devices 14P and output devices 16P.

Bus 28P represents one or more of any of several types of bus structures, including a memory bus or memory controller, a peripheral bus, an accelerated graphics port, and a processor or local bus using any of a variety of bus architectures.

Memory 30P includes computer system readable media in the form of volatile memory 32P and non-volatile or persistent memory 34P.

Program modules include application server 300'; key server 302'; storage server 304' and client 400'. Modules are stored in persistent memory 34P, by way of example and not limitation, as well as an operating system, one or more application programs, a database management system and other program modules. Each of the operating system, one or more application programs, other program modules, and program data or some combination thereof, may include an implementation of a networking environment. Modules are provided to carry out the functions and/or methodologies of the embodiments in a parallel environment as described herein.

Application server 300'; key server 302'; storage server 304' are autonomous parts of the embodiment. In operation, these parts are extracted from persistent memory 34P and loaded into volatile memory 32P as modules 300.1'; 302.1'; and 304.1' so that they may be executed separately and therefore in parallel by respective CPU 22A; CPU 22B and CPU 22C.

In this example, three CPUs are shown but more CPUs could be used to build alternative parallel embodiments. In this example, separate CPUs are used but a single processing unit having multiple cores could be used to build an alternative embodiment. In this example, the CPUs are physical CPUs but a computer server includes a virtual computing environment and virtual parallel processing units could be used to build a virtual parallel computing embodiment. A computer server includes a virtual computing environment having a virtual processing unit with multiple virtual cores. Further embodiments can include combinations of: real processing units; real processing unit cores; virtual processing units; and virtual parallel processing cores.

It will be clear to one skilled in the art that many improvements and modifications can be made to the foregoing exemplary embodiment without departing from the scope of the present invention.

What is claimed is:

1. A method for collaboratively editing a document in a system of sharee clients, the method comprising:
    creating a document change;
    generating a document token for encrypting the document change;
    encrypting, using a processor, the document change with the document token, wherein the encrypted document change is loaded onto one or more Cloud servers;
    making the encrypted document change available to sharee clients;
    forming a share document token by splitting the document token into a server document token and a sharee document token;

generating a plurality of copies of the sharee document token;
encrypting each sharee document token with a respective sharee's public key;
distributing each encrypted sharee document token to respective sharee clients;
wherein each sharee client is configured to:
  decrypt the encrypted sharee document token using a respective private key;
  combine the decrypted sharee document token with the server document token;
  decrypt the encrypted document change using the combined share document token; and
  consolidate the decrypted document change into the document.

2. The method of claim 1, wherein every piece of the document is protected.

3. The method of claim 1, wherein the encrypted document is stored in a document server.

4. The method of claim 1, wherein the encrypted tokens are stored in a key server.

5. The method of claim 1, wherein the document change is a creation of a new document.

6. The method of claim 1, wherein the document change is an addition or deletion of content to an existing document.

7. A system for collaboratively editing a document between a plurality of sharee clients comprising:
a processing hardware programmed to initiate executable operations comprising:
creating a document change;
generating a document token for encrypting the document change;
encrypting, using a processor, the document change with the document token, wherein the encrypted document change is loaded onto one or more Cloud servers;
making the encrypted document change available to sharee clients;
forming a share document token by splitting the document token into a server document token and a sharee document token;
generating a plurality of copies of the sharee document token;
encrypting each sharee document token with a respective sharee's public key;
distributing each encrypted sharee document token to respective sharee clients;
wherein each sharee client is configured to:
  decrypt the encrypted sharee document token using a respective private key;
  combine the decrypted sharee document token with the server document token;
  decrypt the encrypted document change using the combined share document token; and
  consolidate the decrypted document change into the document.

8. The system of claim 7, wherein every piece of the document is protected.

9. The system of claim 7, wherein the encrypted document is stored in a document server.

10. The system of claim 7, wherein the encrypted tokens are stored in a key server.

11. The system of claim 7, wherein the document change is a creation of a new document.

12. A computer program product for collaboratively editing a document in a system of sharee clients, the computer program product comprising a computer readable storage device having program code stored thereon, the program code executable by a processor to perform a method comprising:
creating, using the processor, a document change;
generating, using the processor, a document token for encrypting the document change;
encrypting, using the processor, the document change with the document token;
wherein the encrypted document change is loaded onto one or more Cloud servers;
making, using the processor, the encrypted document change available to sharee clients;
forming a share document token by splitting the document token into a server document token and a sharee document token;
generating, using the processor, a plurality of copies of the sharee document token;
encrypting, using the processor, each sharee document token with a respective sharee's public key;
distributing each encrypted sharee document token to respective sharee clients;
wherein each sharee client is configured to:
  decrypt the encrypted sharee document token using a respective private key;
  combine the decrypted sharee document token with the server document token;
  decrypt the encrypted document change using the combined share document token; and
  consolidate the decrypted document change into the document.

* * * * *